(12) United States Patent
Kim et al.

(10) Patent No.: US 10,200,419 B2
(45) Date of Patent: *Feb. 5, 2019

(54) METHOD AND ELECTRONIC DEVICE FOR EDITING CONTENT

(71) Applicant: Samsung Electronics Co., Ltd., Suwon (KR)

(72) Inventors: Hak-jung Kim, Goyang (KR);
Young-cheol Kang, Anyang (KR);
Won-young Seo, Suwon (KR);
Hyung-sun Ryu, Yongin (KR);
Byeong-yong Jeon, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/966,822

(22) Filed: Aug. 14, 2013

(65) Prior Publication Data

US 2014/0053084 A1  Feb. 20, 2014

(30) Foreign Application Priority Data

Aug. 14, 2012 (KR) .................. 10-2012-0088956

(51) Int. Cl.
*H04L 29/06* (2006.01)
*G06Q 10/10* (2012.01)
(Continued)

(52) U.S. Cl.
CPC ........ *H04L 65/403* (2013.01); *G06F 3/04842* (2013.01); *G06Q 10/101* (2013.01); *H04L 67/10* (2013.01)

(58) Field of Classification Search
CPC ............ G06F 2221/2147; G06F 17/30165–17/30171;
(Continued)

(56) References Cited

U.S. PATENT DOCUMENTS 5,515,491 A * 5/1996 Bates et al. .................. 715/754
5,844,555 A * 12/1998 Menaker ................. G06F 17/10
715/205

(Continued)

FOREIGN PATENT DOCUMENTS

CN  101632073 A  1/2010
CN  101855629 A  10/2010
(Continued)

OTHER PUBLICATIONS

Chinese Office Action dated Sep. 14, 2017, issued in the Chinese Application No. 201380043502.6.
(Continued)

*Primary Examiner* — Jennifer N To
*Assistant Examiner* — Liang Y Li
(74) *Attorney, Agent, or Firm* — Jefferson IP Law, LLP

(57) ABSTRACT

A content editing method and apparatus for efficiently editing of content by allowing one user who edits the content to confirm a region of the content edited by another user. The content editing method includes displaying a content select interface used by the first electronic device to select content stored in a server; displaying a content edit interface used to edit the content if the content is selected through the displayed content select interface; and displaying an object informing a redundant access to the selected content when a second electronic device attempts to edit a part of the selected content that is being edited by the first electronic device through the content edit interface.

32 Claims, 23 Drawing Sheets

(51) Int. Cl.
*H04L 29/08* (2006.01)
*G06F 3/0484* (2013.01)

(58) Field of Classification Search
CPC ...... G06F 17/21–17/248; G06F 3/0482; G06F 3/04842; G06F 21/62; G06F 2221/04; G06F 17/241; G06F 2217/04; G06F 3/048; G06Q 10/101–10/103; G06Q 10/10; G06Q 50/18; H04L 65/403–65/4053; H04L 67/24; H04L 51/043; H04L 51/04; H04L 67/10
See application file for complete search history.

(56) References Cited

U.S. PATENT DOCUMENTS

| | | | |
|---|---|---|---|
| 6,983,416 B1 | 1/2006 | Bae et al. | |
| 7,472,351 B1* | 12/2008 | Zilka | G06Q 10/107 709/206 |
| 7,769,810 B1* | 8/2010 | Kaufman | G06F 17/24 709/205 |
| 7,814,429 B2 | 10/2010 | Buffet et al. | |
| 7,949,633 B1 | 5/2011 | Shaver et al. | |
| 7,962,853 B2* | 6/2011 | Bedi | G06F 17/248 709/206 |
| 8,116,444 B2 | 2/2012 | Pearson et al. | |
| 8,510,646 B1* | 8/2013 | Young | G06F 17/241 715/230 |
| 9,547,635 B2 | 1/2017 | Bailor et al. | |
| 2004/0107224 A1 | 6/2004 | Bera | |
| 2005/0210393 A1* | 9/2005 | Maeng | G06Q 10/10 715/751 |
| 2005/0232423 A1* | 10/2005 | Horvitz | G06Q 10/10 380/255 |
| 2007/0027872 A1* | 2/2007 | Johnson et al. | 707/9 |
| 2008/0229184 A1 | 9/2008 | Prish et al. | |
| 2008/0276184 A1* | 11/2008 | Buffet | G06Q 10/10 715/752 |
| 2009/0043848 A1* | 2/2009 | Kordun | 709/205 |
| 2009/0125518 A1 | 5/2009 | Bailor et al. | |
| 2009/0157811 A1 | 6/2009 | Bailor et al. | |
| 2009/0327294 A1 | 12/2009 | Bailor et al. | |
| 2010/0257457 A1 | 10/2010 | De Goes | |
| 2011/0004835 A1* | 1/2011 | Yanchar et al. | 715/763 |
| 2011/0184906 A1* | 7/2011 | Bailor et al. | 707/608 |
| 2011/0283177 A1* | 11/2011 | Gates | G06F 17/243 715/224 |
| 2012/0066577 A1 | 3/2012 | Saini et al. | |
| 2013/0160142 A1* | 6/2013 | Lai | G06F 21/6209 726/28 |
| 2013/0173482 A1* | 7/2013 | Twining | G06Q 50/188 705/310 |
| 2016/0364199 A1 | 12/2016 | Bailor et al. | |

FOREIGN PATENT DOCUMENTS

| | | |
|---|---|---|
| CN | 102508840 A | 6/2012 |
| EP | 1 868 149 A1 | 12/2007 |
| EP | 2 212 807 B1 | 11/2017 |
| KR | 2001-0094087 | 10/2001 |
| KR | 10-2007-0119518 A | 12/2007 |
| KR | 10-2010-0084644 A | 7/2010 |
| WO | 2009/079116 A3 | 6/2009 |

OTHER PUBLICATIONS

Korean Intellectual Property Office, Notice of Non-Final Rejection, dated Jun. 8, 2018 in Korean Application No. 10-2012-0088956.

* cited by examiner

EVRA "THERE WERE 15 IN THE ENGLAND CAMP"

FRANCE HELD ON FOR A 1-1 DRAW WITH ENGLAND AT THE FIRST MATCH IN EURO 2012 GROUP D HELD IN UKRAINE DONBASS ARENA AT DAWN OF 12$^{TH}$(KOREAN TIME).
FRANCE DOMINATED ENGLAND EVERYWHERE EXCEPT ON THE SCOREBOARD
GOAL PERCENTAGE 60 40 ------------------------------------------------------
------------------------    ------------------------------
----------------  ----------

KNOWN AS A BEST FRIEND OF JISUNG PARK ----------------------------------------

METHOD AND ELECTRONIC DEVICE FOR EDITING CONTENT

CROSS-REFERENCE TO RELATED APPLICATIONS

This application claims the benefit of Korean Patent Application No. 10-2012-0088956, filed on Aug. 14, 2012, in the Korean Intellectual Property Office, the disclosure of which is incorporated herein in its entirety by reference.

BACKGROUND

1. Field

The present disclosure relates to a method and device for a plurality of users to edit content, more particularly, in order for a user that edits content by using an electronic device to inform that another user attempts to edit a region of the edited content. The present disclosure also relates to a method and device for more efficiently editing content by facilitating communication between a user and another user.

2. Description of the Related Art

In drafting diverse types of content, a cooperative review process between a plurality of users is frequently performed. When a device of another user accesses and edits content stored in an electronic device or a server, if the plurality of users edit the same region of the content, only the editing made by some users among the editing made by the plurality of users is problematically reflected on the content.

SUMMARY

Additional aspects and/or advantages will be set forth in part in the description which follows and, in part, will be apparent from the description, or may be learned by practice of the invention.

The present disclosure provides a method and electronic device for editing content by informing that another electronic device edits a region of content when the electronic device edits the content, thereby preventing the content from being redundantly edited.

The present disclosure also provides a method and server for editing content when a plurality of electronic devices edit the content stored in a server, thereby preventing a region of the content from being redundantly edited.

According to an aspect, there is provided a method in which a first electronic device edits content, the method including: displaying a content select interface used by the first electronic device to select content stored in a server; displaying a content edit interface used to edit the content if the content is selected through the displayed content select interface; and displaying an object informing a redundant access to the selected content when a second electronic device attempts to edit a part of the selected content that is being edited by the first electronic device through the content edit interface.

An editing request for content may be received from the second electronic device. The method may include comparing the received editing request with the part of the content that is being edited by the first electronic device and determining whether the second electronic device attempts to edit the part of the selected content that is being edited by the first electronic device according to a result of comparison.

The displaying of the object informing the redundant access to the selected content may include: displaying a message window used to transmit and receive a message to and from the second electronic device.

The method may further include: generating an alarm sound when the second electronic device attempts to edit the part of the content.

The displaying of the object informing the redundant access to the selected content may include: displaying identification information of the second electronic device.

The method may further include: setting a locking region in the content that is not editable by the second electronic device.

The method may further include: receiving information regarding a locking region of the content that is set by the second electronic device that accesses the server and edits the content and of which editing of the first electronic device is limited; and displaying the received information regarding the locking region on the content edit interface.

The method may further include: displaying identification information of the second electronic device.

The method may further include: receiving content modification information regarding the content edited by the second electronic device; determining whether the second electronic device has edited a region of the content edited by the first electronic device based on the received content modification information; and displaying the content edited by the second electronic device and included in an editing request received from the second electronic device on the content edit interface according to a result of determination.

The displaying of the content select interface may include: outputting information regarding the second electronic device that is accessing the content so as to edit the content.

The information regarding the second electronic device may include identification information of the second electronic device.

The information regarding the second electronic device may include one of an access time of the second electronic device with respect to the content and a location of the second electronic device.

The method may further include: setting a region of the content that is editable by the second electronic device.

The method may further include: displaying the set region of the content that is editable by the second electronic device in a predetermined color.

The editing request received from the second electronic device for the content may include an operation of the second electronic device to select the part of the content.

The content select interface may output a list of contents that are editable by the first electronic device and display the content that is being edited by the first electronic device from among the list of contents that are editable by the first electronic device on a predetermined region of the content select interface.

An editing request of the second electronic device may include part of the content selected by the second electronic device and information regarding the content edited by the second electronic device, and the displaying of the object informing the redundant access to the selected content includes: receiving the editing request of the second electronic device from the server.

According to an aspect, there is provided a method in which a server edits stored content, the method including: receiving an editing request for a part of the content from a first electronic device from among a plurality of electronic devices that access the content so as to the edit the content; setting an editing region of the first electronic device according to the editing request received from the first electronic device; receiving an editing request for a part of the content from a second electronic device from among the plurality of electronic devices; and transmitting information informing a redundant access to the content to the first electronic device if the editing request received from the second electronic device is related to the editing region of the first electronic device.

According to an aspect, there is provided a first electronic device for editing content stored in a server, the first electronic device comprising: a user interface unit for generating a content select interface used by the first electronic device to select the content and a content edit interface used to edit the selected content through the content select interface; an object generating unit for generating an object informing a redundant access to the content when a second electronic device attempts to edit a part of the selected content that is being edited by the first electronic device through the content edit interface; and an output unit for displaying the content select interface, the content edit interface, and the object.

According to an aspect, there is provided a server for storing content, the server comprising: an editing region setting unit for setting an editing region for a first electronic device that is a region in which the first electronic device edits the content, according to an editing request received from the first electronic device that access the content so as to the edit the content; a determining unit for determining whether an editing request received from the second electronic device is related to the editing region for the first electronic device, according to the editing request received from the second electronic device; and a transmitting unit for transmitting information informing a redundant access to the content to the first electronic device if the determining unit determines that the editing request received from the second electronic device is related to the editing region of the first electronic device.

According to an aspect, there is provided a method in which a first electronic device edits content, the method comprising: displaying a content select interface used by the first electronic device to select the content stored in a server; displaying a content edit interface used to edit the content when the content is selected through the displayed content select interface; setting a part of the content as a locking region through the content edit interface; and displaying an object informing a redundant access to the content when a second electronic device attempts to edit the set locking region.

According to an aspect, there is provided a method in which a server edits stored content, the method comprising: receiving information requesting to set a locking region from a first electronic device from among a plurality of electronic devices that access the content so as to the edit the content; setting the locking region of the first electronic device according to the request received from the first electronic device; receiving an editing request for a part of the content from a second electronic device from among the plurality of electronic devices; and transmitting information informing a redundant access to the content to the first electronic device if the editing request received from the second electronic device is related to the locking region of the first electronic device.

According to an aspect, there is provided a computer-readable recording medium having recorded thereon a computer program for executing the above-described methods.

BRIEF DESCRIPTION OF THE DRAWINGS

The above and other features and advantages will become more apparent by describing in detail exemplary embodiments thereof with reference to the attached drawings in which.

DETAILED DESCRIPTION

Figure 1:
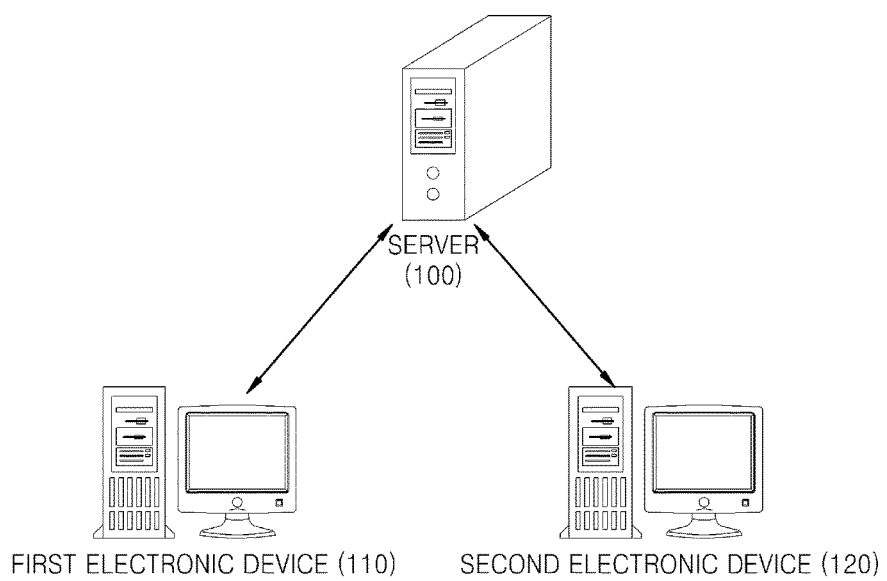
FIG. 1 is a diagram showing a configuration of a system in which a plurality of electronic devices access and edit content stored in a server, according to an embodiment.

Reference will now be made in detail to the embodiments, examples of which are illustrated in the accompanying drawings, wherein like reference numerals refer to the like elements throughout. The embodiments are described below to explain the present invention by referring to the figures.

Hereinafter, the present disclosure will be described in detail by explaining embodiments of the invention with reference to the attached drawings. The invention may, however, be embodied in many different forms and should not be construed as being limited to the embodiments set forth herein. In the drawings, for clear explanation of the invention, parts not related to the explanation are not illustrated and similar reference numerals denote similar elements.

In this specification, it will be understood that when an element, such as a layer, a region, or a substrate, is referred to as being "on", "connected to", or "coupled to" another element, it may be directly on, connected, or coupled to the other element or intervening elements may be present. It will be further understood that the terms "comprises" and/or "comprising" specify the presence of stated features, integers, steps, operations, elements, and/or components, but do not preclude the presence or addition of one or more other features, integers, steps, operations, elements, components, and/or groups thereof, unless the context clearly indicates otherwise.

Expressions such as at least one of, when preceding a list of elements, modify the entire list of elements and do not modify the individual elements of the list.

FIG. 1 is a diagram showing a configuration of a system in which a plurality of electronic devices access and edit content stored in a server 100, according to an embodiment.

In this regard, a first electronic device 110 and a second electronic device 120 may be displayable and communicable devices, for example, a PC including a display device, a portable terminal, a tablet PC, etc. Also, content may be information such as a document, a moving image, a photo, etc. that may be drafted and edited through an electronic device.

When the content is stored in the server 100, the first electronic device 110 and the second electronic device 120 access the server 100 to edit the content. The first electronic device 110 and the second electronic device 120 may transmit an editing request for editing the content to the server 100.

The server 100 may edit the content according to the editing request received from the first electronic device 110 and the second electronic device 120. If the content stored in the server 100 is edited, the server 100 may transmit content modification information to the first electronic device 110 and the second electronic device 120 that access the content stored in the server 100.

In this regard, the editing request may include identification information of an electronic device or a user of the electronic device and information regarding a region and an item of content that are to be edited. In this regard, the region that is to be edited may be a region of content selected by the electronic device. For example, the region that is to be edited may be a region of content clicked by the electronic device. The region of the content may be a page of a document if, for example, the content is the document. For another example, if the content is a moving image, the region of the content may be an image of the moving image included in a predetermined time range. The content modification information may include the identification information of the electronic device or the user of the electronic device and information regarding the edited region and item of the content.

The editing request may be transmitted when an electronic device selects a region of content. For example, when a mouse cursor or a keyboard input cursor is placed on a region corresponding to the region of the content or clicks the region, information regarding an occurred event may be transmitted to the server 100. The editing request may include information indicating that the second electronic device 120 performs an operation of selecting the region of the content.

If the server 100 receives the editing request from the first electronic device 110, the server 100 may set an editing region indicating a region being edited by the first electronic device 110. If the server 100 receives an editing request for the editing region of the first electronic device 110 from the second electronic device 120, the server 100 may transmit the editing request of the second electronic device 120 to the first electronic device 110. In this regard, the editing request of the second electronic device 120 may be received from the server 100 or the second electronic device 120.

Figure 2:
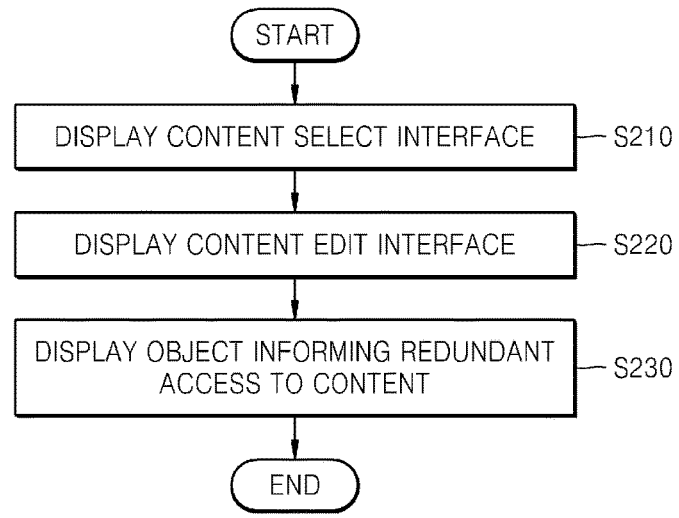
FIG. 2 is a flowchart of a process of informing a redundant access to content when a first electronic device is editing the content, according to an embodiment.

FIG. 2 is a flowchart of a process of informing a redundant access to content when the first electronic device 110 is editing the content, according to an embodiment.

The first electronic device 110 displays a content select interface (operation S210). The content select interface may display a list of contents that may be edited by the first electronic device 110. The content select interface may select content that is to be edited by the first electronic device 110 through the content select interface.

Thereafter, if the content is selected through the content select interface, a content edit interface used to edit the selected content is displayed (operation S220). The content edit interface may display the selected content. A user may edit the content through the content edit interface. The first electronic device 110 may transmit an editing request for editing the content to the server 100 or the second electronic device 120.

Also, the first electronic device 110 may input additional information in a region of the edited content through the content select interface. For example, the first electronic device 110 may input a memo relating to a reason for editing the content in the region of the edited content based on a user input through the content select interface. The first electronic device 110 may transmit the input additional information to the server 100 or the second electronic device 120.

In this regard, according to an embodiment, the content edit interface may be implemented in a web document. For example, content in a word processor document format may be edited through a HyperText Markup Language (HTML) document provided from the server 100. The server 100 may convert and provide the content in the word processor document format into a HTML document format to the first electronic device 110. Information of the content edited through the HTML document may be information used to request to edit content stored in the server 100. The server 100 may convert and store the information regarding the edited document in the HTML document format into the word processor document format.

Also, according to an embodiment, the content edit interface may be implemented through an application installed in the first electronic device 110. For example, the content edit interface may be implemented in a spread sheet application installed in the first electronic device 110. A spread sheet document stored in the server 100 may be edited through the spread sheet application installed in the first electronic device 110. Editing information of the spread sheet document stored in the server 100 may be transmitted to the server 100. In this regard, the editing information of the spread sheet document may be information used to request to edit the spread sheet document stored in the server 100 from the server 100.

Also, according to an embodiment, the content may be a document such as a word processor, a spread sheet, a presentation document, etc. that may be edited through a computer.

Thereafter, when the first electronic device 110 is editing a region of the content through the content edit interface, if the second electronic device 120 is to edit the region of the content being edited by the first electronic device 110, an object informing the redundant access to the content may be displayed.

In this regard, according to an embodiment, if an editing request of the second electronic device 120 for the region of the content being edited by the first electronic device 110 is received, the first electronic device 110 may determine that the second electronic device 120 is to edit the region of the content being edited by the first electronic device 110. As it is determined that the second electronic device 120 is to edit the region of the content being edited by the first electronic device 110, the first electronic device 110 may display the object informing a redundant access to the editing region (operation S230). In this regard, the object informing the redundant access may be a message window informing that the second electronic device 120 has transmitted the editing request for editing the content.

According to an embodiment, the object informing the redundant access to the editing region may be a message window used to transmit and receive messages between the first electronic device 110 and the second electronic device 120.

According to an embodiment, when the editing request of the second electronic device 120 with respect to the editing region is received, an alarm sound informing a redundant access to the content may be generated.

According to an embodiment, the object informing the redundant access to the editing region may be a window displaying identification information of a user of the second electronic device 120. The identification information of the user of the second electronic device 120 may be stored in the editing request of the second electronic device 120 or may be separately received from the server 100 or the second electronic device 120. Identification information of the second electronic device 120 may include information regarding the user of the second electronic device 120 such as a user ID, a user photo, a user name or title.

Figure 3:
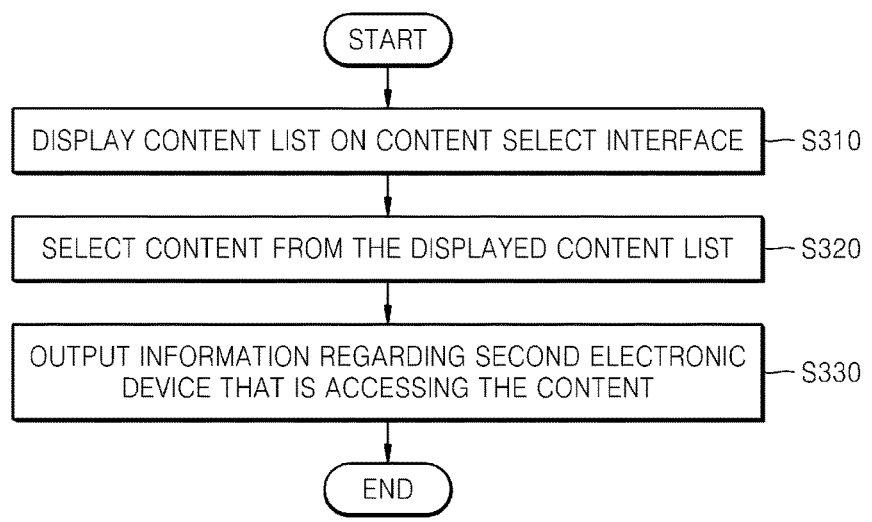
FIG. 3 is a flowchart of a process of displaying information regarding a second electronic device that is accessing content on a content select interface, according to an embodiment.

FIG. 3 is a flowchart of a process of displaying information regarding the second electronic device 120 that is accessing content on a content select interface, according to an embodiment.

A content list may be displayed on the content select interface (operation S310). In this regard, the content list may be a list of contents that are editable by the first electronic device 110. Information regarding the content list may be stored in the first electronic device 110 or may be received from the server 100 or the second electronic device 120.

Figure 17:
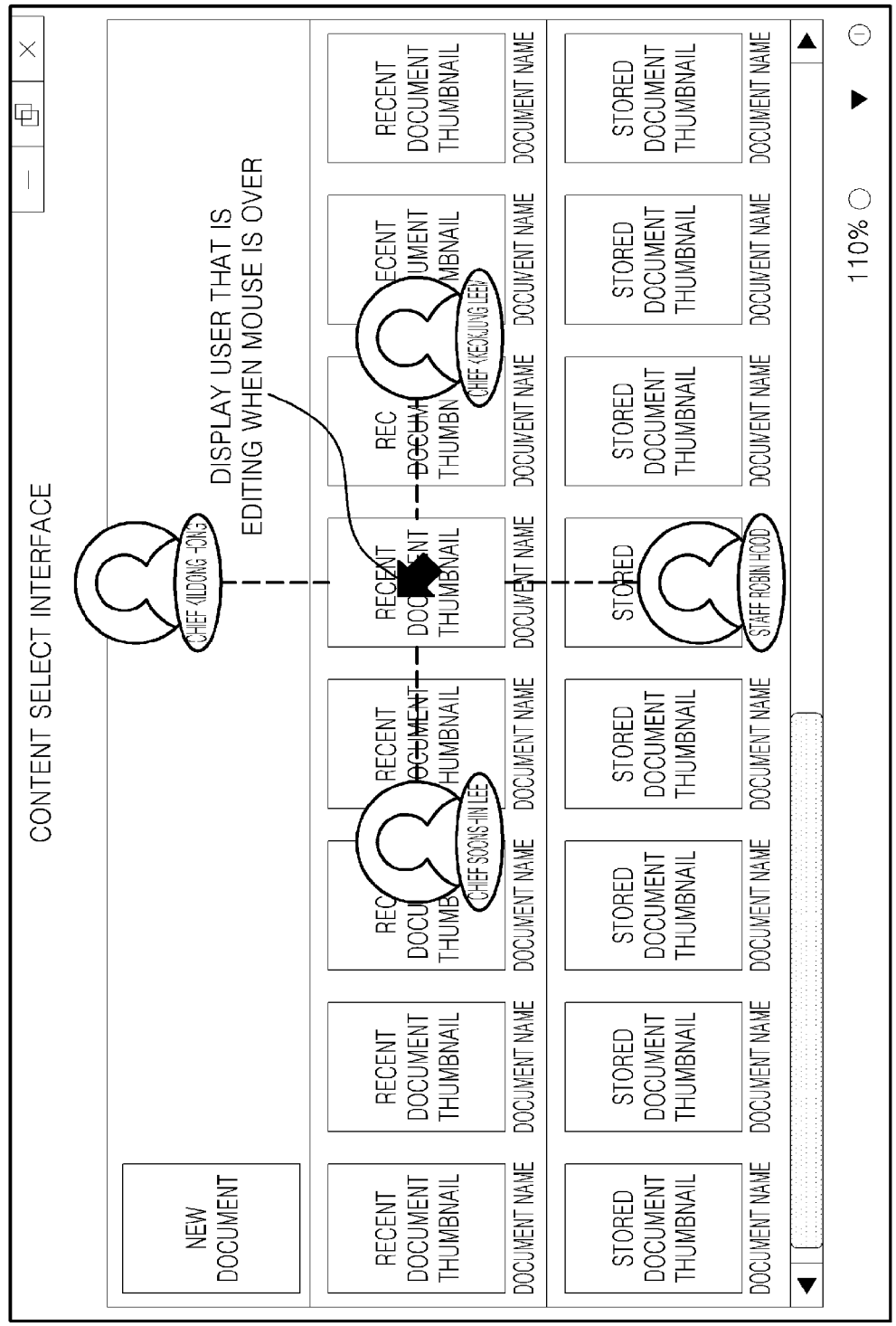
FIG. 17 shows an example of outputting information regarding a second electronic device that accesses content to a content select interface, according to an embodiment.

Thereafter, content that is to be edited may be selected from the displayed content list (operation S320). In this regard, as shown in FIG. 17, information regarding the second electronic device 120 that is accessing the content to edit the content may be output (operation S330). The information regarding the second electronic device 120 that is accessing the content to edit the content may be received from the server 100 or the second electronic device 120.

In this regard, the information regarding the second electronic device 120 may include information regarding a user of the second electronic device 120 such as a user ID, a user photo, a user name or title. Also, the information regarding the second electronic device 120 may include information regarding an access time of the second electronic device 120 to the content and a location of the second electronic device 120. For example, the information regarding the second electronic device 120 may include information regarding a building in which the second electronic device 120 is installed.

Figure 4:
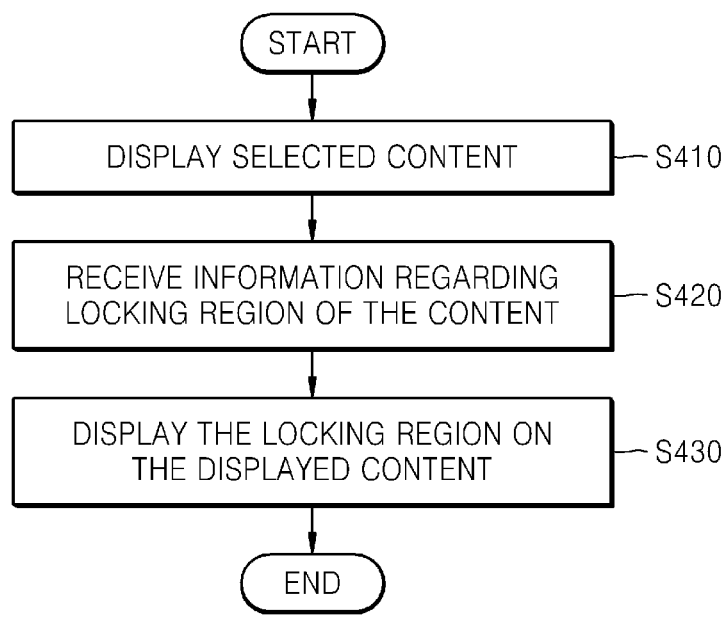
FIG. 4 is a flowchart of a process of displaying information regarding a locking region set by a second electronic device on a content edit interface, according to an embodiment.

FIG. 4 is a flowchart of a process of displaying information regarding a locking region set by the second electronic device 120 on a content edit interface, according to an embodiment.

The first electronic device 110 may display content selected through a content select interface on the content edit interface (operation S410).

Thereafter, the first electronic device 110 may receive information regarding the locking region of the selected content from the server 100 or the second electronic device 120 (operation S420). The second electronic device 120 may set the locking region to prevent an electronic device other than the second electronic device 120 from editing a region of the content. The first electronic device 110 may receive the information regarding the locking region set by the second electronic device 120 and display the information regarding the locking region set by the second electronic device 120 on the content edit interface based on the received information regarding the locking region. The information regarding the locking region of the content may include information regarding the second electronic device 120 that sets the locking region or information regarding a user of the second electronic device 120.

For example, a page of content in a document format that is set by the second electronic device 120 as the locking region may be included in the information regarding the locking region.

Figure 20:
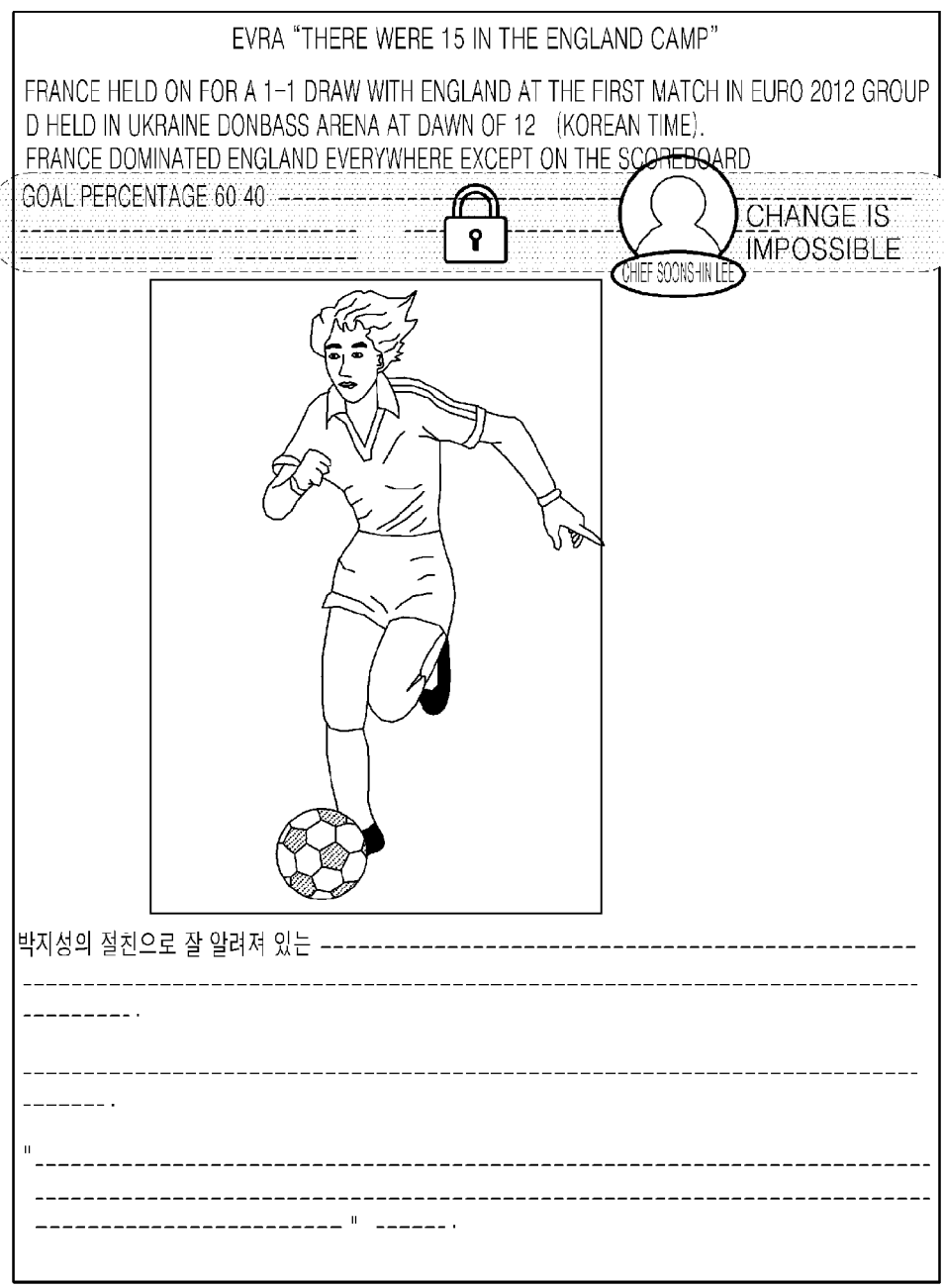
FIG. 20 shows an example of displaying a locking region on a content edit interface, according to an embodiment.

Thereafter, the locking region may be displayed on the displayed content (operation S430). For example, a region of the content corresponding to the locking region may be displayed as shown in FIG. 20 or may be highlighted in a specific color such as yellow. Also, as displayed as "Chief Soonshin LEE" in FIG. 20, the information regarding a user of the second electronic device 120 that sets the locking region may be displayed.

Figure 5:
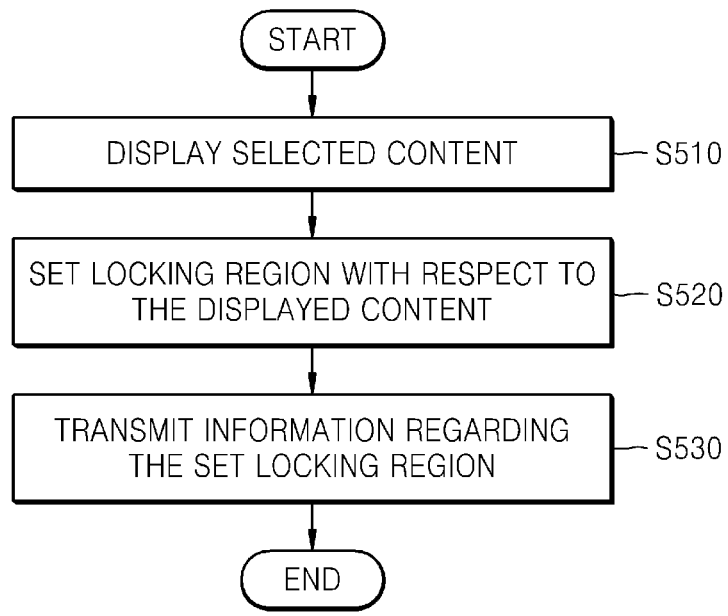
FIG. 5 is a flowchart of a process in which a first electronic device sets a locking region with respect to content, according to an embodiment.

FIG. 5 is a flowchart of a process in which the first electronic device 110 sets a locking region with respect to content, according to an embodiment.

The first electronic device 110 may display content selected through a content select interface on a content edit interface (operation S510).

Thereafter, the first electronic device 110 may set the locking region with respect to the content displayed on the content edit interface (operation S520). For example, a user may drag and select a region of the content and set the selected region as the locking region that is not editable by the second electronic device 120.

Thereafter, the first electronic device 110 may transmit information regarding the set locking region to the server 100 or the second electronic device 120 (operation S530).

Figure 6:
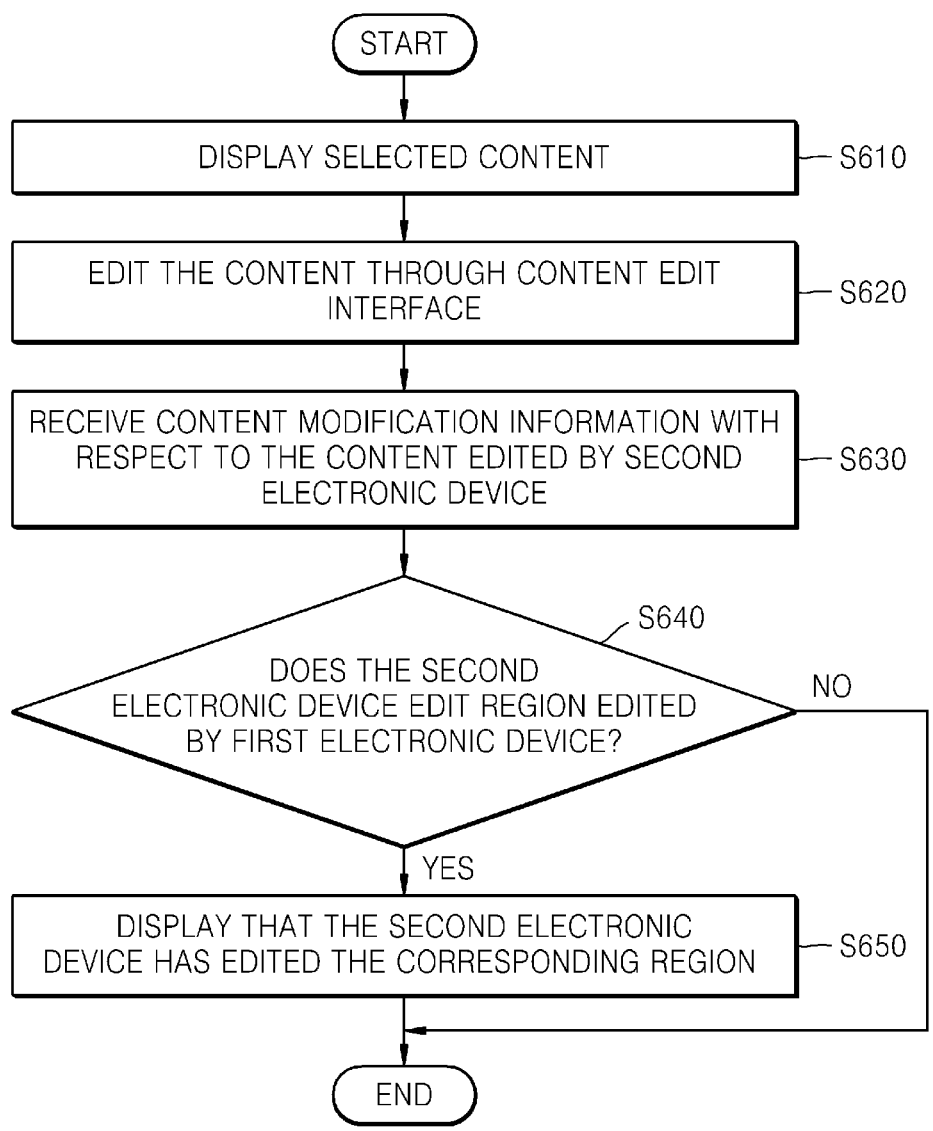
FIG. 6 is a flowchart of a process informing that a second electronic device has edited a region edited by a first electronic device, according to an embodiment.

FIG. 6 is a flowchart of a process informing that the second electronic device 120 has edited a region edited by the first electronic device 110, according to an embodiment.

The first electronic device 110 may display content selected through a content select interface on a content edit interface (operation S610). Thereafter, the first electronic device 110 may edit the content selected through the content edit interface (operation S620).

Thereafter, the first electronic device 110 may receive content modification information regarding the content from the server 100 or the second electronic device 120 (operation S630). In this regard, the content modification information is information regarding a modification of the content made by the second electronic device 120. The content modification information may include identification information of the second electronic device 120 or a user of the second electronic device 120 and information regarding the edited region and item of the content.

Thereafter, the first electronic device 110 may determine whether the second electronic device 120 has edited a region of the content edited by the first electronic device 110 in operation S620 based on the content modification information received in operation S630 (operation S640).

Thereafter, if the second electronic device 120 edited a region of the content edited by the first electronic device 110 in operation S620, the first electronic device 110 may display that the second electronic device 120 has edited the region of the content edited by the first electronic device 110 (operation S650).

In this regard, the first electronic device 110 may output a window indicating a message. Also, the first electronic device 110 may shade a region edited by the second electronic device 120 again in the region of the content edited by the first electronic device 110. The first electronic device 110 may display a token of the user of the second electronic device 120. Also, the first electronic device 110 may output a window used to transmit and receive messages to and from the second electronic device 120.

For example, while the first electronic device 110 is editing a tenth page of a document after editing a first page thereof, if the second electronic device 120 edits the first page of the document, the first electronic device 110 may display a message window indicating that the second electronic device 120 has edited the first page of the document.

Figure 7:
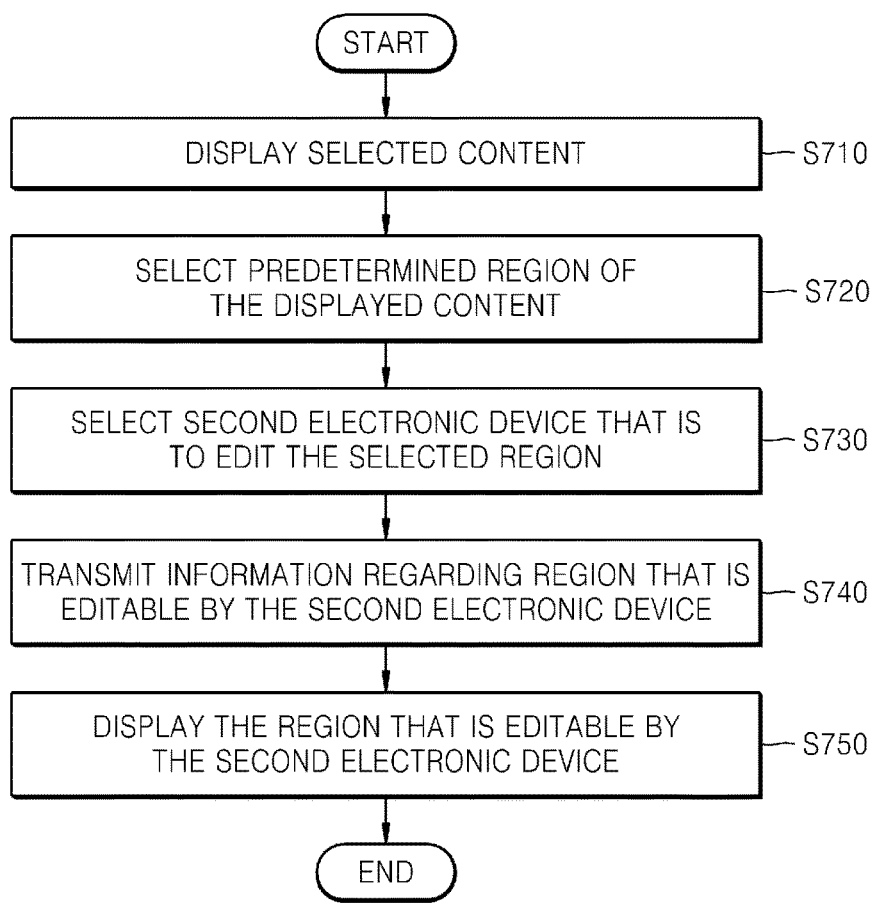
FIG. 7 is a flowchart of a process in which a first electronic device sets an editing region of a second electronic device, according to an embodiment.

FIG. 7 is a flowchart of a process in which the first electronic device 110 sets an editing region of the second electronic device 120, according to an embodiment.

The first electronic device 110 may display content selected through a content select interface on a content edit interface (operation S710). Thereafter, the first electronic device 110 may select a region of the displayed content (operation S720) and select the second electronic device 120 that is to edit the selected region (operation S730).

Thereafter, the first electronic device 110 may set the selected region as an editing region that is editable by the second electronic device 120 and transmit information regarding the set editing region to the server 100 or the second electronic device 120. Alternatively, the first electronic device 110 may transmit the information regarding the editing region including information requesting to set the editing region to the server 100 or the second electronic device 120.

Since the information regarding the editing region is transmitted, the second electronic device 120 may allow only the set editing region of content to be edited. For example, since a user of the first electronic device 110 designates the second electronic device 120 and sets the editing region, a region of the content that is to be edited may be set for each user.

Thereafter, the first electronic device 110 may display a region that is editable by the second electronic device 120. In this regard, the first electronic device 110 may display the region that is editable by the second electronic device 120 in a predetermined color.

Figure 8:
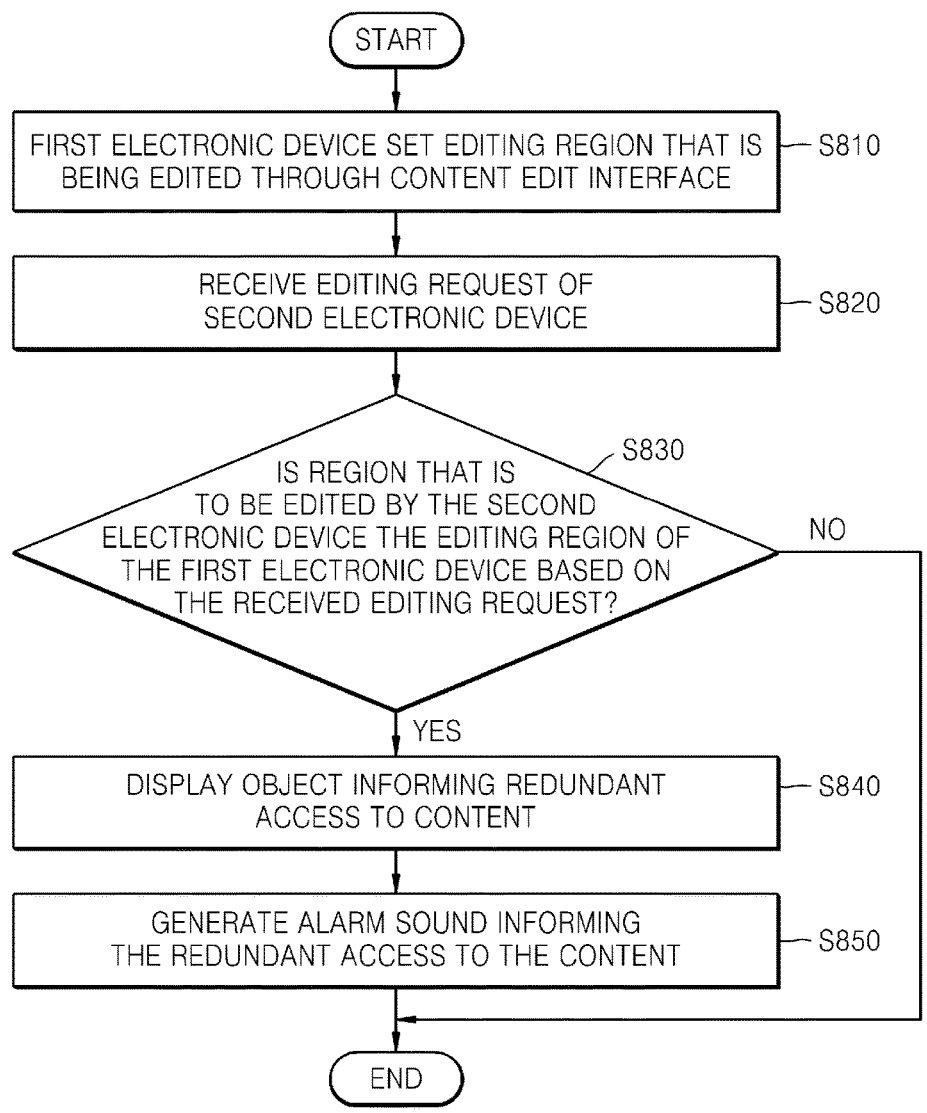
FIG. 8 is a flowchart of a process of informing a redundant access of a second electronic device to content, according to an embodiment.

FIG. 8 is a flowchart of a process of informing a redundant access of the second electronic device 120 to content, according to an embodiment. FIG. 8 is a detailed flowchart of operation S330, according to an embodiment.

The first electronic device 110 may set an editing region that is being edited through a content edit interface (operation S810). In this regard, a region optionally selected by a user of the first electronic device 110 may be set as the editing region. Alternatively, a region including a location of the content input through the content edit interface may be set as the editing region.

Thereafter, the first electronic device 110 may receive an editing request of the second electronic device 120 (operation S820). The first electronic device 110 may determine whether a region that is to be edited by the second electronic device 120 corresponds to the editing region of the first electronic device 110 based on the received editing request (operation S830).

Thereafter, if the region that is to be edited by the second electronic device 120 corresponds to the editing region of the first electronic device 110, the first electronic device 110 may display an object informing the redundant access to the content (operation S840) and generate an alarm sound informing the redundant access to the content (operation S850). In this regard, the object informing the redundant access to the content may be a message window for transmitting and receiving messages between the first electronic device 110 and the second electronic device 120. For another example, the object informing the redundant access to the content may be an object displaying information regarding the second electronic device 120 that edits the content.

Figure 9:
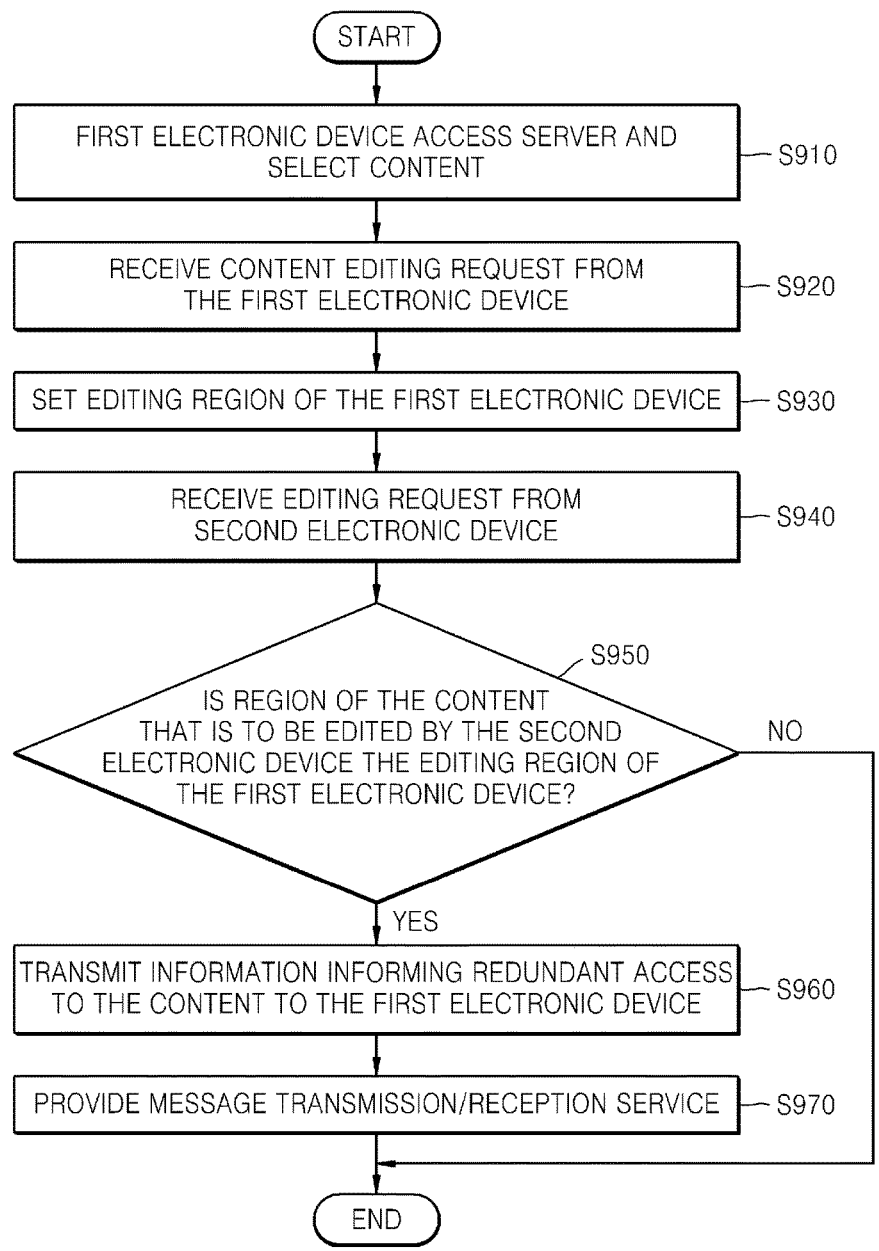
FIG. 9 is a flowchart of a process in which a server informs a first electronic device of a redundant access of a second electronic device, according to an embodiment.

FIG. 9 is a flowchart of a process in which the server 100 informs the first electronic device 110 of a redundant access of the second electronic device 120, according to an embodiment.

The first electronic device 110 may access the server 100 and select content that is to be edited (operation S910). Thereafter, the server 100 may receive an editing request for the selected content from the first electronic device 110 (operation S920).

Thereafter, the server 100 may set an editing region of the first electronic device 110 with respect to the selected content according to the received editing request (operation S930). In this regard, the editing region is a region included in the content edited by the first electronic device 110. The server 100 may store information regarding the editing region in a storage unit 1570.

Thereafter, the server 100 may receive an editing request from the second electronic device 120 (operation S940). The server 100 may confirm a region of the content that is to be edited by the second electronic device 120 based on the editing request received from the second electronic device 120. The server 100 may determine whether the region of the content that is to be edited by the second electronic device 120 is the editing region of the first electronic device 110 (operation S950).

If the second electronic device 120 is determined to edit the editing region of the first electronic device 110 in operation S950, the server 100 may transmit information informing a redundant access to the content to the first electronic device 110 (operation S960).

In this regard, according to an embodiment, the information informing the redundant access to the content may be the editing request received from the second electronic device 120. According to an embodiment, the information informing the redundant access to the content may include information regarding the second electronic device 120 or a user of the second electronic device 120. According to an embodiment, the information informing the redundant access to the content may be a message informing the redundant access to the content.

Also, if the second electronic device 120 is determined to edit the editing region of the first electronic device 110 in operation S950, the server 100 may provide the first electronic device 110 and the second electronic device 120 with a service for transmitting and receiving messages between the first electronic device 110 and the second electronic device 120.

Figure 10:
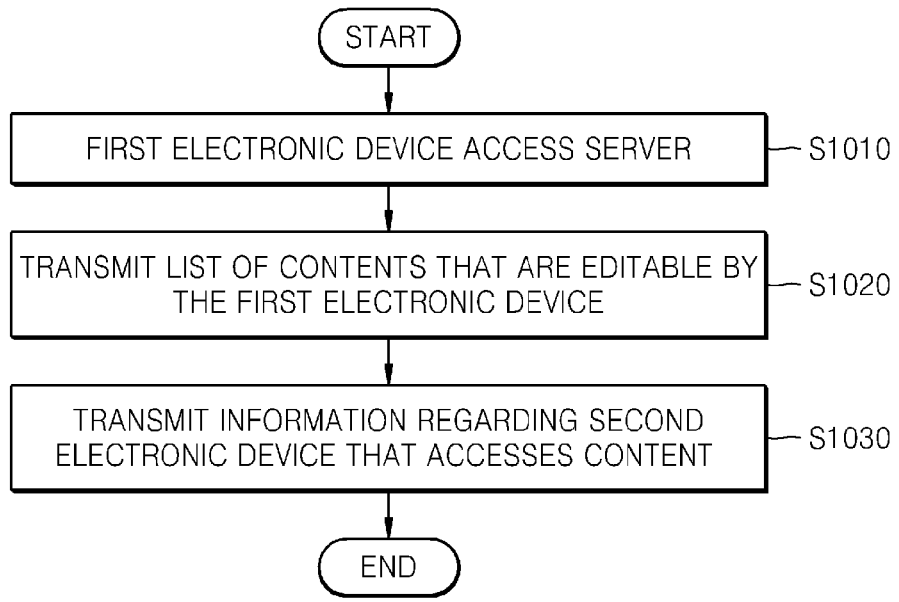
FIG. 10 is a flowchart of a process in which a server transmits information regarding a list of contents that are to be displayed on a content select interface of a first electronic device and regarding a second electronic device that accesses content, according to an embodiment.

FIG. 10 is a flowchart of a process in which the server 100 transmits information regarding a list of contents that are to be displayed on a content select interface of the first electronic device 110 and regarding the second electronic device 120 that accesses content, according to an embodiment.

The first electronic device 110 accesses the server 100 to edit content (operation S1010). Thereafter, the server 110 transmits a list of contents that are editable by the first electronic device 110 to the first electronic device 110 (operation S1020). Thereafter, the server 100 may transmit information regarding the second electronic device 120 that accesses the content to the first electronic device 110 (operation S1030).

In this regard, the server 100 may transmit the information regarding the second electronic device 120 for each piece of content accessed by the second electronic device 120 to the first electronic device 110. Also, the server 10 may transmit information regarding the second electronic device 120 that accesses content selected by the first electronic device 110 to the first electronic device 110.

According to an embodiment, the information regarding the second electronic device 120 that accesses the content may include information regarding a user of the second electronic device 120 and information regarding a content access time of the second electronic device 120 and a location of the second electronic device 120. In this regard, the information regarding the user of the second electronic device 120 may include at least one of a user ID, name, and title. The information regarding the location of the second electronic device 120 may be information stored in the server 100 or received from the second electronic device 120. For example, a number of a seat in which the second electronic device 120 is installed may be included in the information regarding the location of the second electronic device 120.

Figure 11:
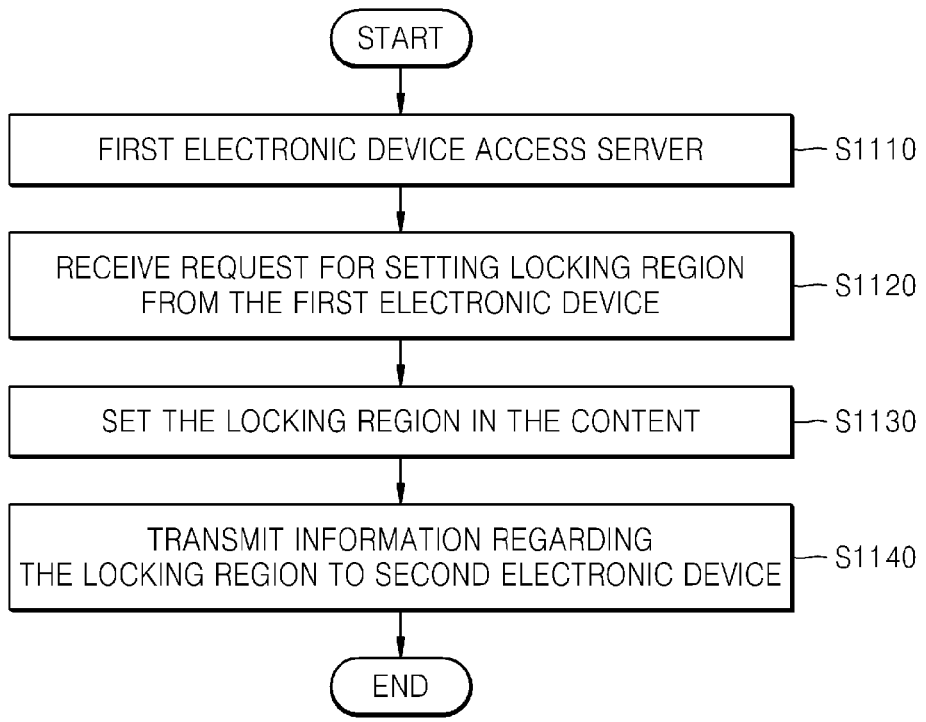
FIG. 11 is a flowchart of a process in which a server receives a request from a first electronic device and sets a locking region, according to an embodiment.

FIG. 11 is a flowchart of a process in which the server 100 receives a request from the first electronic device 110 and sets a locking region, according to an embodiment.

The first electronic device 110 may access the server 100 and select content (operation S1110). The server 100 may receive information requesting to set the locking region in the selected content from the first electronic device 110 (operation S1120). In this regard, the request for setting the locking region may include identification information of the selected content and the first electronic device 110 and information used to identify a region of the content of which locking region is requested to be set.

Figure 12:
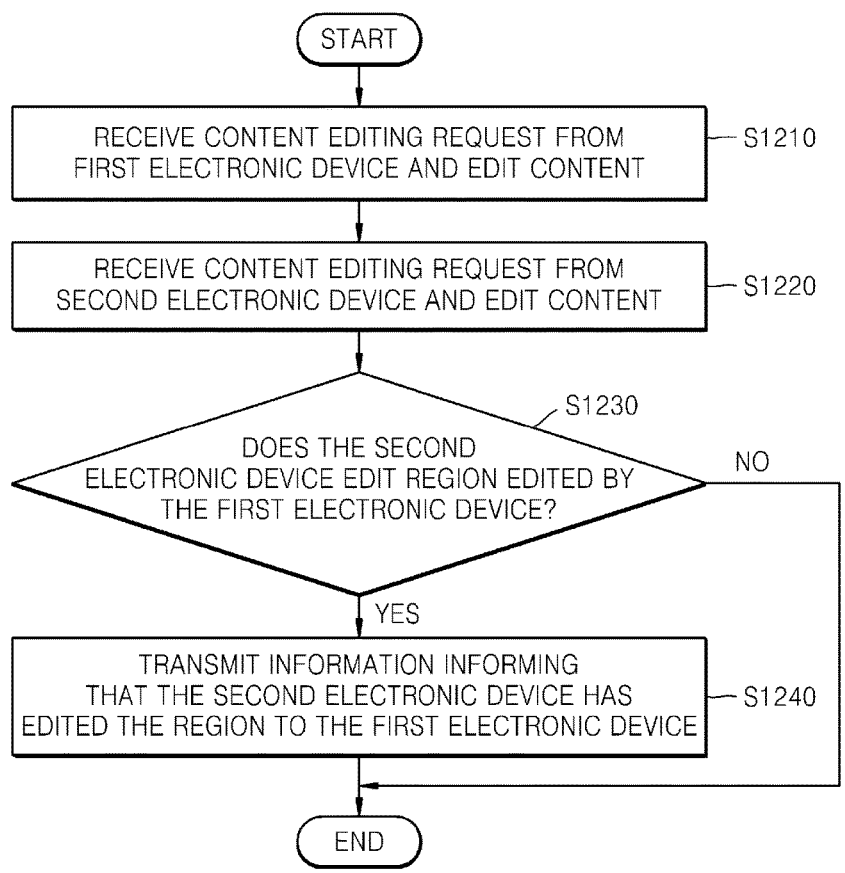
FIG. 12 is a flowchart of a process in which a server informs a first electronic device that a second electronic device has edited a region edited by the first electronic device, according to an embodiment.

FIG. 12 is a flowchart of a process in which the server informs the first electronic device 110 that the second electronic device 120 has edited a region edited by the first electronic device 110, according to an embodiment.

The server 100 may receive an editing request for content from the first electronic device 110. The server 100 may edit the content based on the editing request received from the first electronic device 110 (operation S1210).

Thereafter, the server 100 may receive an editing request for the content from the second electronic device 120. The server may edit the content based on the editing request received from the second electronic device 120 (operation S1220).

When a region of the content edited based on the editing request received from the first electronic device 110 in operation S1210 is edited based on the editing request received from the second electronic device 120 in operation S1220 (operation S1230), the server 100 may transmit information informing that the second electronic device 120 has edited the region edited by the first electronic device 110 to the first electronic device 110.

For example, when the first electronic device 110 edits a first page of a document stored in the server 100 and then the second electronic device 120 edits the first page of the document stored in the server 100 again, the server 100 may transmit information informing that the first page of the document has been edited by the second electronic device 120 to the first electronic device 110.

Figure 13:
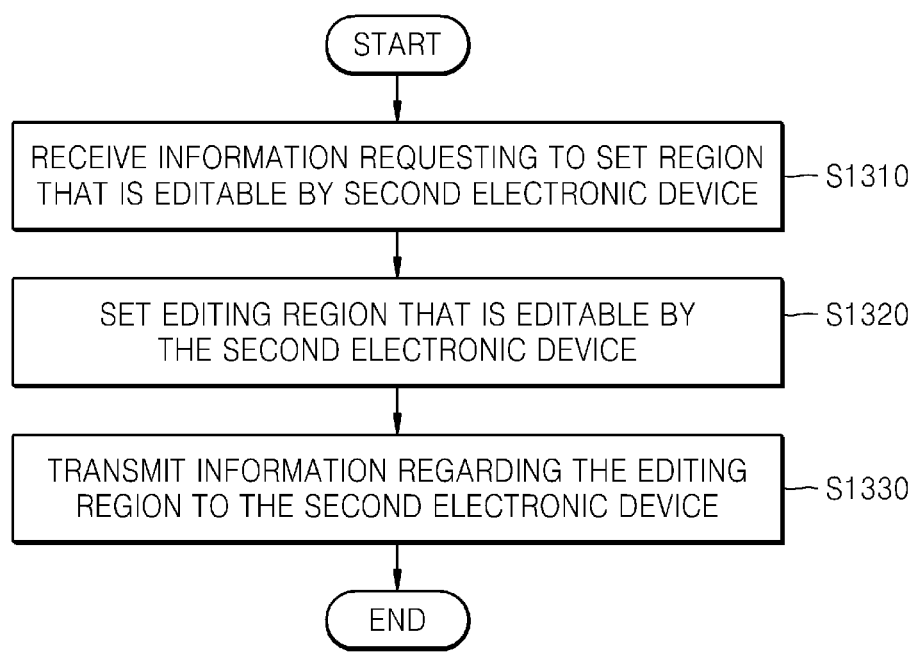
FIG. 13 is a flowchart of a process of receiving a request from a first electronic device and setting an editing region of a second electronic device, according to an embodiment.

FIG. 13 is a flowchart of a process of receiving a request from the first electronic device 110 and setting an editing region of the second electronic device 120, according to an embodiment.

The server 100 may receive information requesting to set the editing region of the second electronic device 120 with respect to content from the first electronic device 110 (operation S1310). In this regard, the editing region is a region of content that is editable by the second electronic device 120.

For example, the second electronic device 120 may be set to be able to edit first page through third page of a document or a section between one minute and five minutes from a start point of a moving image.

The server 100 according to an embodiment may transmit information regarding a set locking region to the first electronic device 110 or the second electronic device 120. In this regard, the server 100 may transmit the information regarding the locking region and information regarding a user of the first electronic device 110. That is, like the second electronic device 120 of FIG. 20, the server 100 may allow the set locking region and the information regarding the user of the first electronic device 110 that sets the locking region to be displayed.

Figure 14:
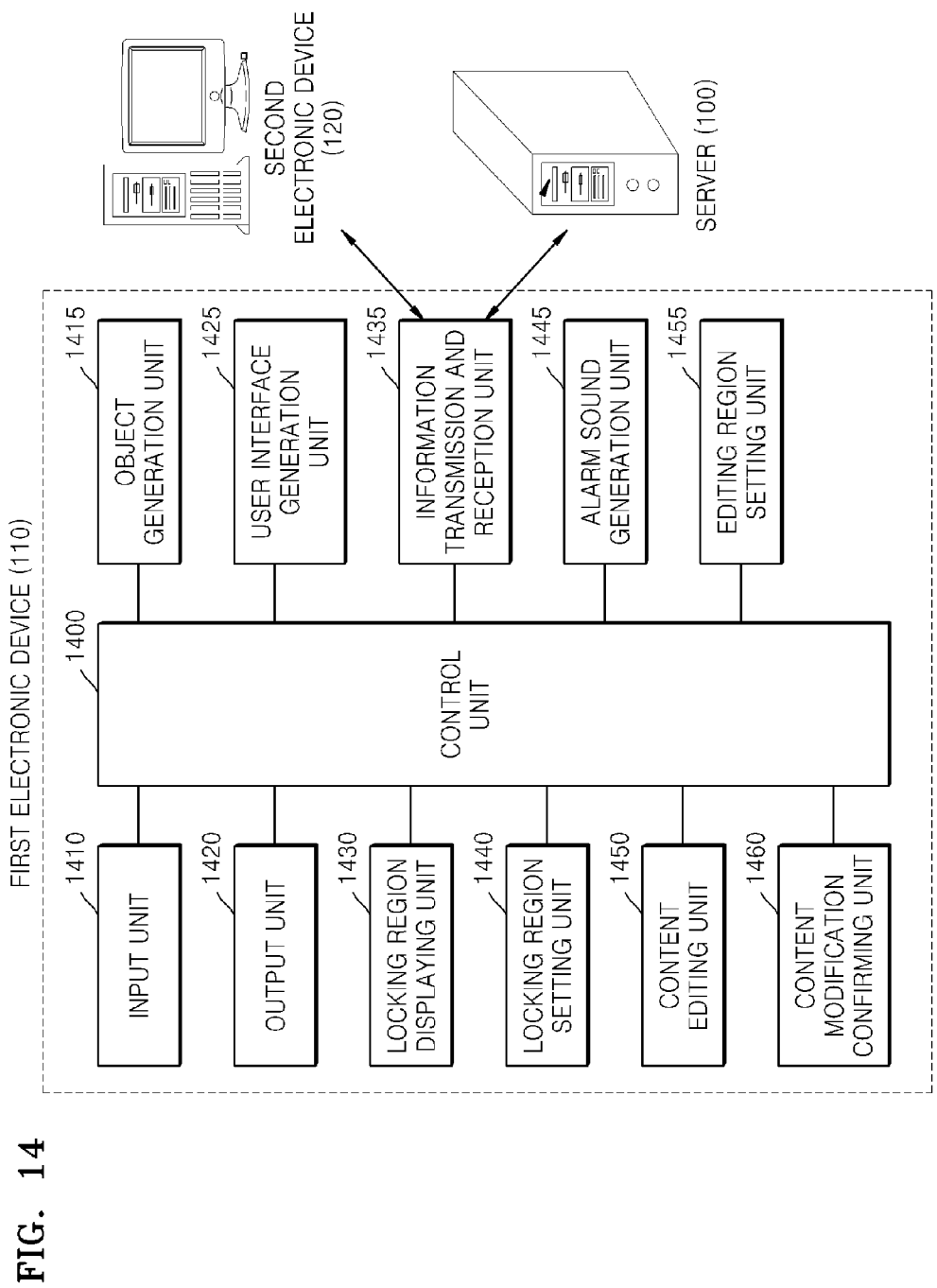
FIG. 14 is a diagram showing a configuration of a first electronic device, according to an embodiment.

FIG. 14 is a diagram showing a configuration of the first electronic device 110, according to an embodiment.

The first electronic device 110 according to an embodiment may include an input unit 1410 receiving a user input, an object generation unit 1415 generating an object informing that the second electronic device 120 is to edit an editing region that is being edited by the first electronic device 110, an output unit 1420 displaying a content select interface, a content edit interface, and the object generated by the object generation unit 1415, a user interface generation unit 1425 generating the content select interface and the content edit interface, a locking region displaying unit 1430 displaying a locking region set by the second electronic device 120 on the content edit interface, an information transmission and reception unit 1435 transmitting and receiving information between the server 100 and the second electronic device 120, a locking region setting unit 1440 setting a locking region that is editable only by the first electronic device 110 in content, an alarm sound generation unit 1445 generating an alarm sound informing that the second electronic device 120 is to edit the editing region that is being edited by the first electronic device 110, a content editing unit 1450 editing the content based on the user input through the content edit interface, an editing region setting unit 1455 setting an editing region that is a region editable by the second electronic device 120, a content modification confirming unit 1460 receiving content modification information and modifying the content displayed on the content edit interface based on the received content modification information, and a control unit 1400 controlling the above elements.

The input unit 1410 may be configured as a device for receiving the user input such as a key board, a mouse, and a touch panel. The output unit 1420 may be configured as a device for outputting an image such as a liquid crystal display (LCD) panel. Also, the input unit 1410 and the output unit 1420 may be configured as a single device such as a touch screen.

The output unit 1420 may display the content select interface and the content edit interface generated by the user interface generation unit 1425 and the object generated by the object generation unit 1415.

The user interface generation unit 1425 may generate the content select interface used to select content by receiving the user input in the first electronic device 110 and the content edit interface used to edit the content selected through the content select interface.

Also, the user interface generation unit 1425 may output information regarding the second electronic device 120 that is accessing content so as to edit the content on the content select interface. The information regarding the second electronic device 120 that is accessing content so as to edit the content may be received from the server 100 or the second electronic device 120 through the information transmission and reception unit 1435.

Also, the content select interface may output a list of contents that are editable by the first electronic device 110 and display content that is being edited by the first electronic device 110 from among the output list on a predetermined region of the content select interface. For example, the content that is being edited may be disposed on an upper end of the content select interface such that a user may easily confirm the content that is being edited.

The object generation unit 1415 may generate an object informing a redundant access to the content when the first electronic device 110 receives an editing request of the second electronic device 120 with respect to the content from the server 100 or the second electronic device 120 while editing a region of the content through the content edit interface.

In this regard, the object generation unit 1415 may generate a message window for transmitting and receiving a message to and from the second electronic device 120. According to another embodiment of the present invention, the object generation unit 1415 may generate an object for displaying identification information of a user of the second electronic device 120. According to an embodiment, the object generation unit 1415 may generate a message window for outputting a message informing that the second electronic device 120 is to edit the content.

In this regard, the editing request of the second electronic device 120 with respect to the content may include information regarding an operation of selecting a region of the content performed by the second electronic device 120. For example, the editing request may include information indicating that the second electronic device 120 places a cursor on a first paragraph of a document or performs an operation of clicking the first paragraph.

The alarm sound generation unit 1445 may generate the alarm sound informing that the second electronic device 120 is to edit the content when the first electronic device 110 receives the editing request of the second electronic device 120 with respect to the content from the server 100 or the second electronic device 120 while editing the region of the content through the content edit interface.

The locking region setting unit 1440 may set a locking region of the content that is not editable by the second electronic device 120 except the first electronic device 110. In this regard, information requesting to set the locking region may be transmitted to the server 100 or the second electronic device 120 through the information transmission and reception unit 1435.

The locking region displaying unit 1430 may receive information regarding a locking region for limiting editing of the first electronic device 110 with respect to the content that is set by the second electronic device 120 through the information transmission and reception unit 1435. The locking region displaying unit 1430 may display the locking region on the content edit interface.

In this regard, the locking region displaying unit 1430 may display information regarding the user of the second electronic device 120 that sets the locking region through the information transmission and reception unit 1435 on the content edit interface.

The content editing unit 1450 may modify content displayed on the content edit interface based on the content modification information received from the server 100 or the second electronic device 120 through the information transmission and reception unit 1435. Also, the content editing unit 1450 may modify the content displayed on the content edit interface by receiving a user input through the input unit 1410.

The content modification confirming unit 1460 may receive the content modification information through the information transmission and reception unit 1435. When a region of content edited by the first electronic device 110 is modified by the second electronic device 120 based on the content modification information, the content modification confirming unit 1460 may display an item of the content edited by the second electronic device 120 on the content edit interface.

For example, when a first page of a document is edited by the first electronic device 110 and then is edited by the second electronic device 120 again, an item edited by the second electronic device 120 may be displayed as a message or an edited region may be highlighted in a red color on the content editing interface of the first electronic device 110.

Also, the content modification confirming unit 1460 may display the information regarding the user of the second electronic device 120 on the content edit interface.

The editing region setting unit 1455 may set an editing region that is a part of content that is editable by the second electronic device 120. Also, the editing region setting unit 1455 may transmit information instructing the part of the content and information requesting to set the editing region to the server 100 of the second electronic device 120.

For example, the editing region setting unit 1455 may set a second page of the document to be edited and to be highlighted in the red color on the content editing interface of the first electronic device 110.

Figure 15:
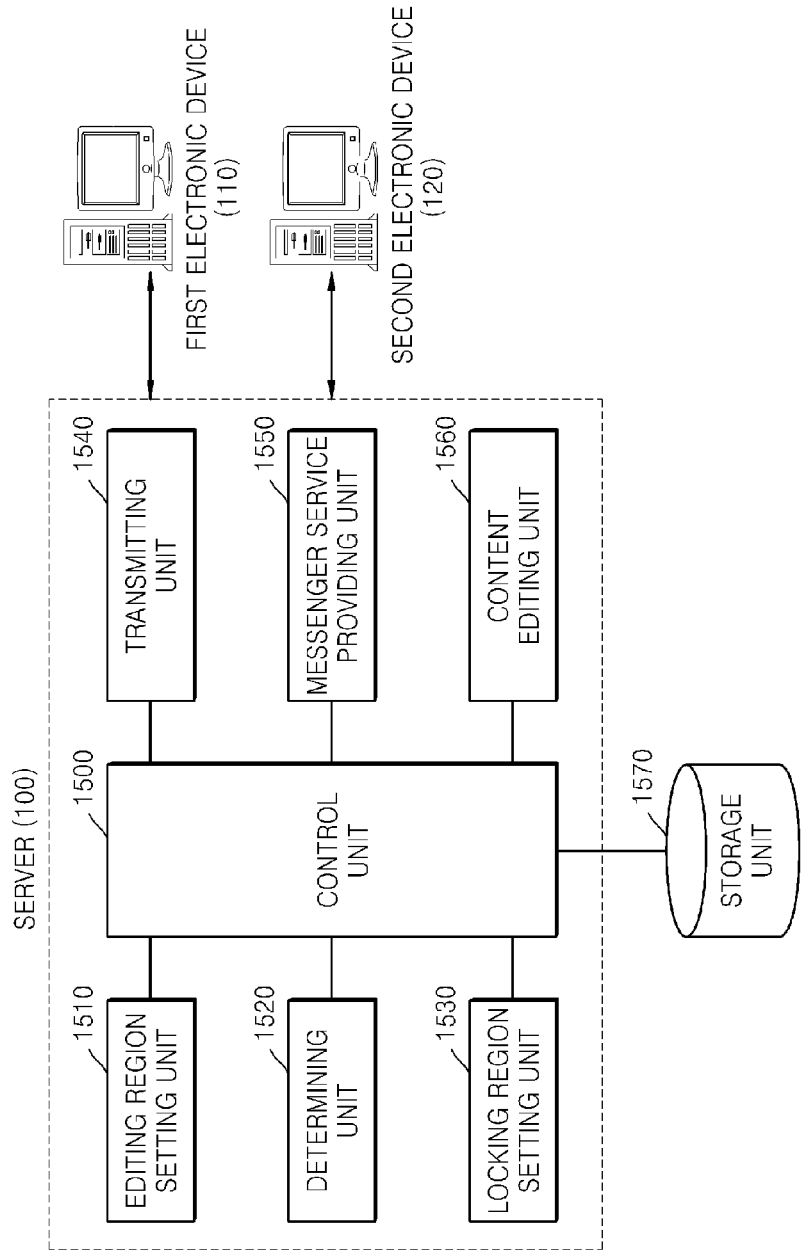
FIG. 15 is a diagram showing a configuration of a server, according to an embodiment.

FIG. 15 is a diagram showing a configuration of the server 100, according to an embodiment.

The server 100 according to an embodiment may include an editing region setting unit 1510 setting an editing region, a determining unit 1520 determining whether an editing request of the second electronic device 120 relates to the editing region of the first electronic device 110, a locking region setting unit 1530 setting a locking region of content, a transmitting unit 1540 transmitting information to the first electronic device 110 and the second electronic device 120, a messenger service providing unit 1550 providing a service for transmitting and receiving a message to and from the first electronic device 110 and the second electronic device 120, a content editing unit 1560 editing content by receiving the editing request, a storage unit 1570 storing the information, and a control unit 1500 controlling the above units.

The editing region setting unit 1510 may receive the editing request regarding a region of content from the first electronic device 110 that accesses the content so as to edit the content and set the editing region that is a region of the content being edited by the first electronic device 110 according to the received editing request.

The editing region setting unit 1510 may receive information requesting to set a region that is editable by the second electronic device 120 from the first electronic device 110 and set an editing region of the second electronic device 120 based on the received information.

The determining unit 1520 may receive the editing request regarding the region of the content from the second electronic device 120 and determine whether the editing request of the second electronic device 120 relates to the editing region of the first electronic device 110.

If the determining unit 1520 determines that the editing request of the second electronic device 120 relates to the editing region of the first electronic device 110, the transmitting unit 1540 may transmit information informing a redundant access to the content to the first electronic device 110. In this regard, the information informing the redundant access to the content may be the editing request received from the second electronic device 120.

In this regard, the transmitting unit 1540 may transmit information regarding a user of the second electronic device 120 stored in the storage unit 1570 or received from the second electronic device 120.

If the locking region of content is set, the transmitting unit 1540 may transmit information regarding the set locking region to the first electronic device 110 or the second electronic device 120. The information regarding the locking region to the first electronic device 110 or the second electronic device 120 may include identification information regarding a device that sets the locking region.

Also, the transmitting unit 1540 may transmit a list of contents that are editable by the first electronic device 110 and information regarding the second electronic device 120 that accesses the server 100 so as to edit the contents included in the list of contents to the first electronic device 110.

If the determining unit 1520 determines that the editing request of the second electronic device 120 relates to the editing region of the first electronic device 110, the messenger service providing unit 1550 may provide the service for transmitting and receiving the message to and from the first electronic device 110 and the second electronic device 120.

The locking region setting unit 1530 may receive a request for setting the locking region of content from the first electronic device 110. The locking region setting unit 1530 may set the locking region according to the received request for setting the locking region. A part of the content of which locking region is set may be set not to be edited by the second electronic device 120.

The content editing unit 1560 may receive the editing request for the content from the first electronic device 110 or the second electronic device 120 and edit the content. Also, according to an embodiment, the content editing unit 1560 may determine whether the region edited by the first electronic device 110 was edited according to the editing request of the second electronic device 120.

In this regard, if the content editing unit 1560 determines that the region edited by the first electronic device 110 was edited according to the editing request of the second electronic device 120, the transmitting unit 1540 may transmit content modification information including information informing the first electronic device 110 that the second electronic device 120 edited the region edited by the first electronic device 110 to the second electronic device 120.

Figure 16:
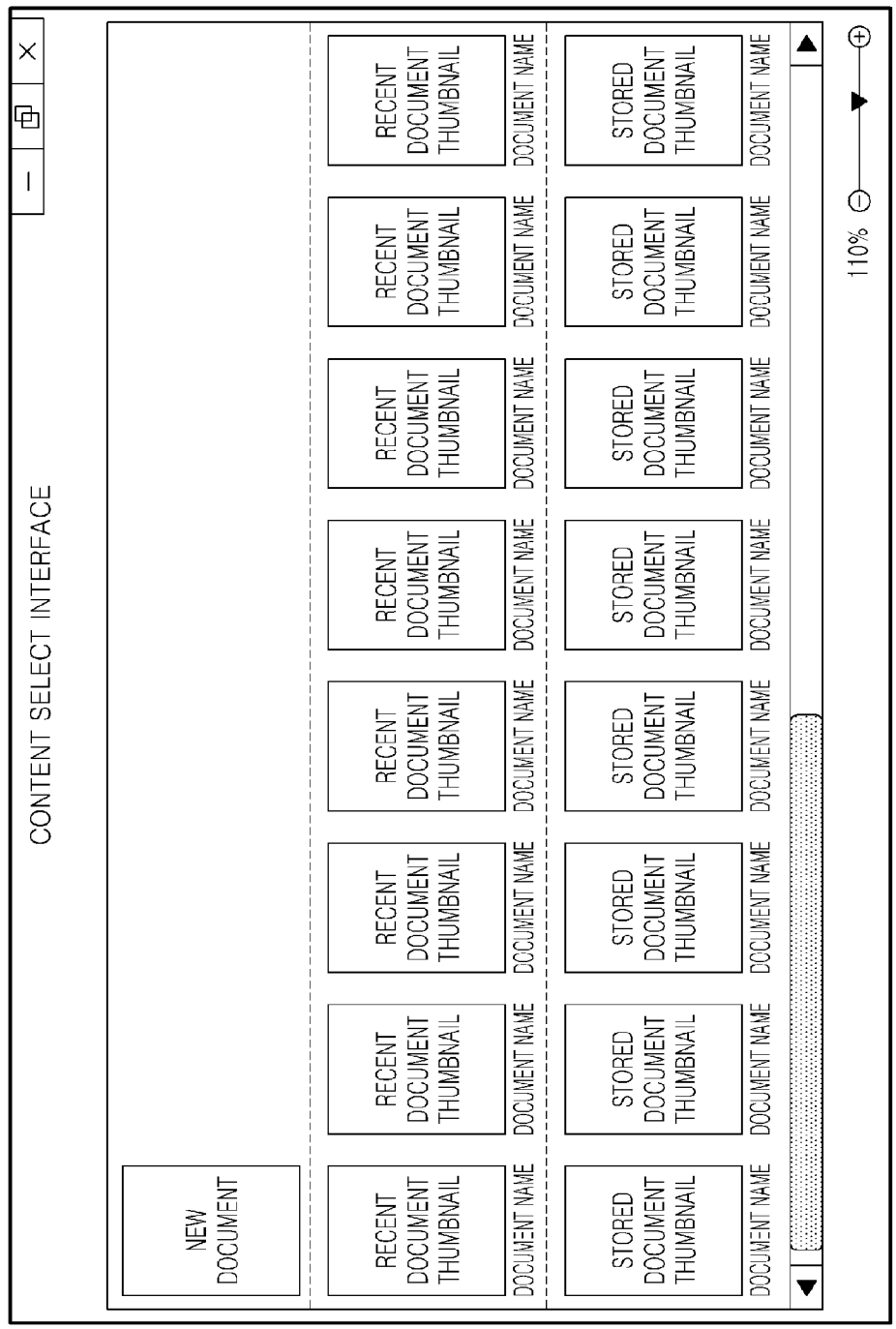
FIG. 16 shows an example of a content select interface, according to an embodiment.

FIG. 16 shows an example of a content select interface, according to an embodiment.

The content select interface may display a list of contents that are editable by the first electronic device 110, as shown in FIG. 16, and select content that is to be edited from the displayed list through a content edit interface.

FIG. 17 shows an example of outputting information regarding the second electronic device 120 that accesses content to a content select interface, according to an embodiment.

If the first electronic device 110 places a mouse cursor on one of a list of contents that are editable by the first electronic device 110 and displayed on the content select interface, information regarding the second electronic device 120 that is accessing the content on which the mouse cursor is placed may be output.

Figure 18:
FIG. 18 shows an example of outputting content on a content edit interface, according to an embodiment.

FIG. 18 shows an example of outputting content on a content edit interface, according to an embodiment.

The content edit interface may display the content in order for the first electronic device 110 to edit the content as shown in FIG. 18.

Figure 19:
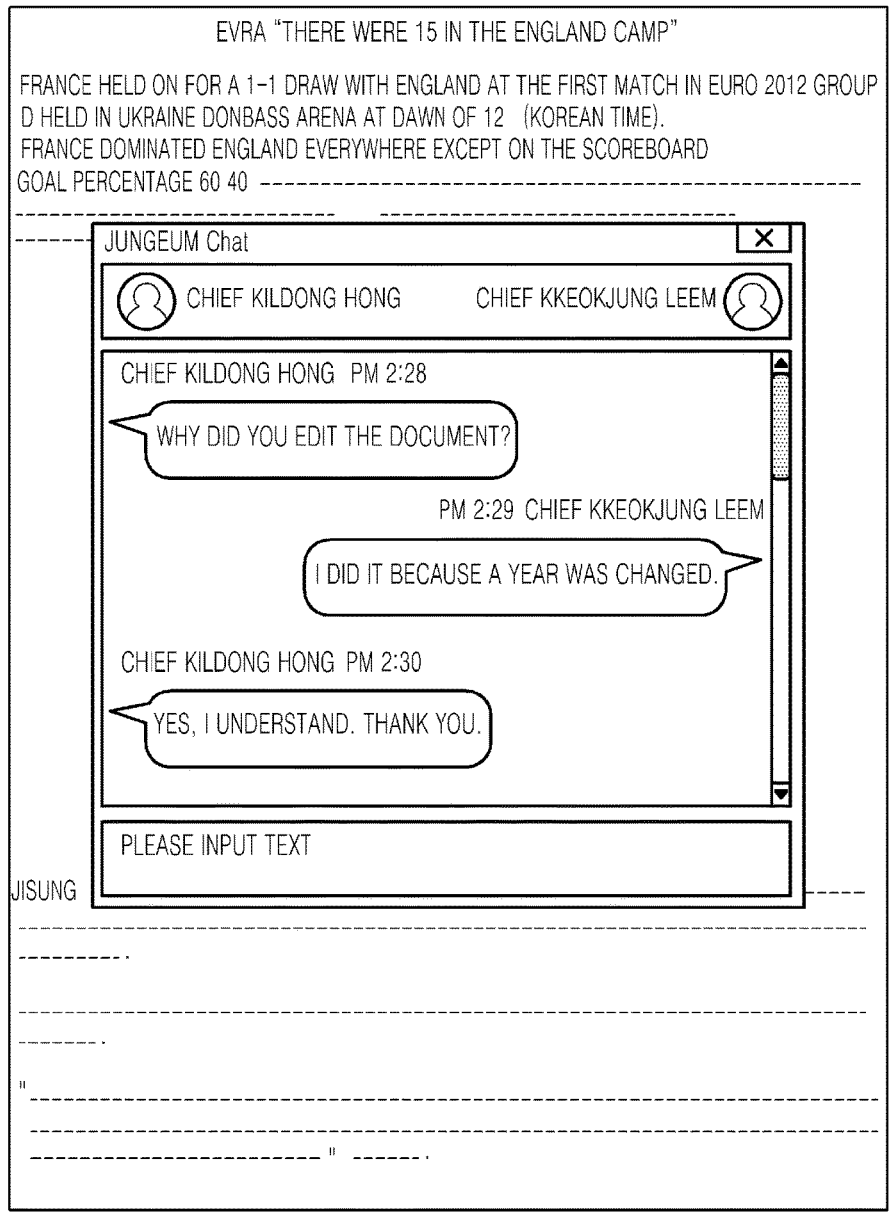
FIG. 19 shows an example of displaying a message window for transmitting and receiving a message to and from a second electronic device, according to an embodiment.

FIG. 19 shows an example of displaying a message window for transmitting and receiving a message to and from the second electronic device 120, according to an embodiment.

When a region of content that is being edited or was edited by the first electronic device 110 is selected or edited by the second electronic device 120 to edit the region in a content edit interface, the first electronic device 110 may output the message window for transmitting and receiving the message to and from the second electronic device 120.

FIG. 20 shows an example of displaying a locking region on a content edit interface, according to an embodiment.

The first electronic device 110 may display the locking region set by the second electronic device 120 and display information regarding a user of the second electronic device 120 on the content edit interface as shown in FIG. 20.

Figure 21:
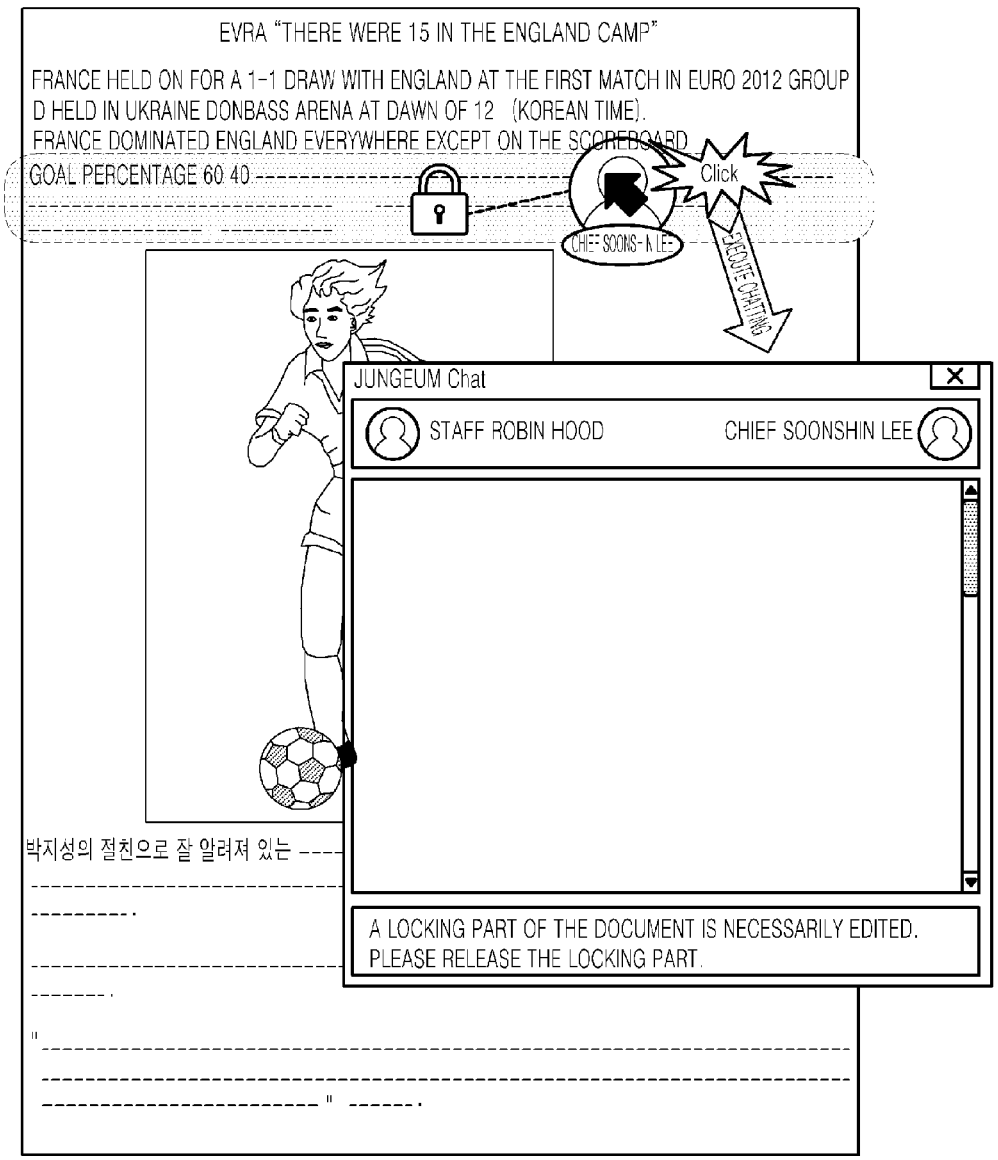
FIG. 21 shows an example of displaying a message window for transmitting and receiving a message to and from a second electronic device of a user that select and sets a locking region, according to an embodiment.

FIG. 21 shows an example of displaying a message window for transmitting and receiving a message to and from the second electronic device 120 of a user that select and sets a locking region, according to an embodiment.

The locking region or information regarding the user of the second electronic device 120 that is displayed on a content edit interface is selected; the first electronic device 110 may display the message window for transmitting and receiving the message to and from the second electronic device 120.

Figure 22:
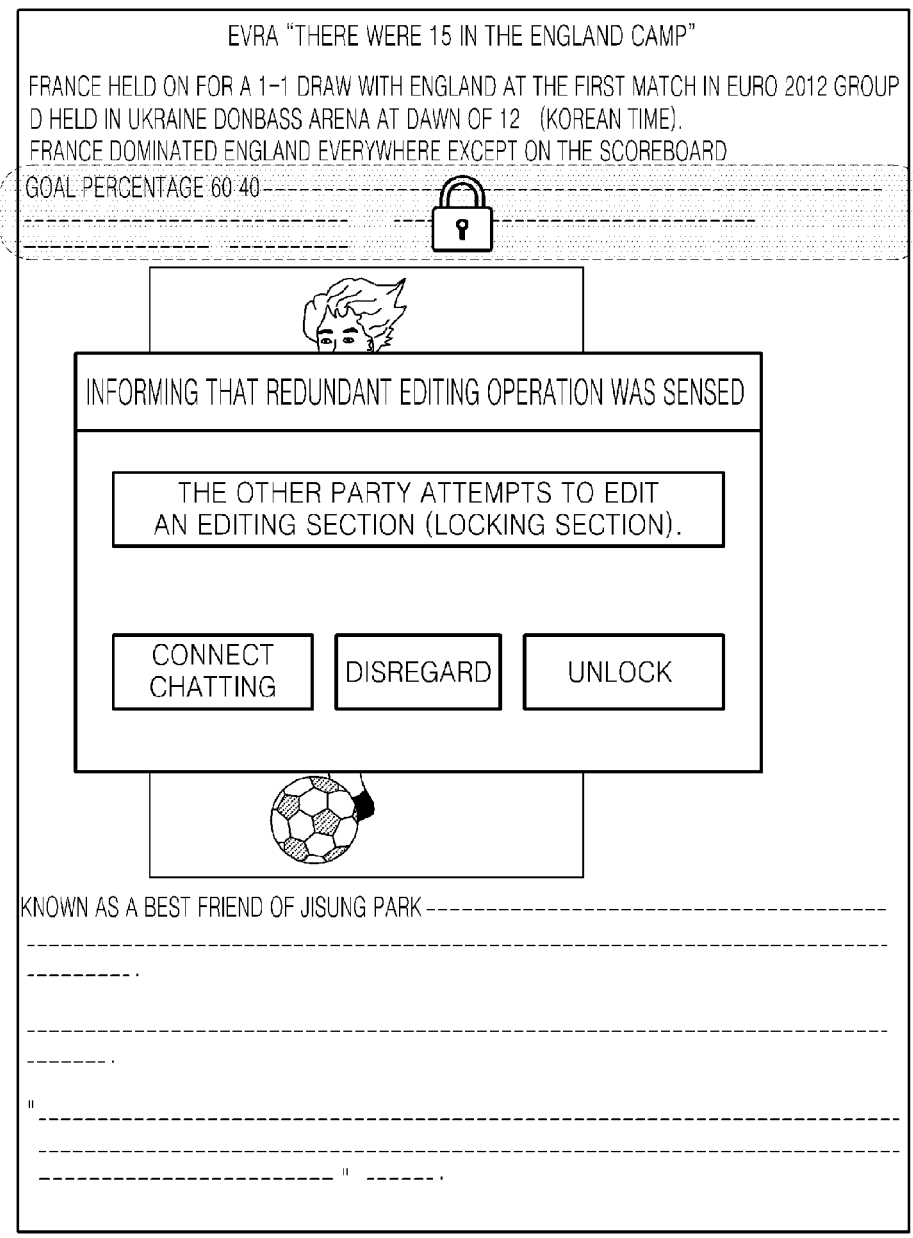
FIG. 22 shows an example of displaying a message window informing a redundant access on a first electronic device when a second electronic device selects a locking region, according to an embodiment.

FIG. 22 shows an example of displaying a message window informing a redundant access on the first electronic device 110 when the second electronic device 120 selects a locking region, according to an embodiment.

When a region of content being edited by the first electronic device 110 is to be selected or edited by the second electronic device 120, the first electronic device 10 may display the message window informing the redundant access.

Figure 23:
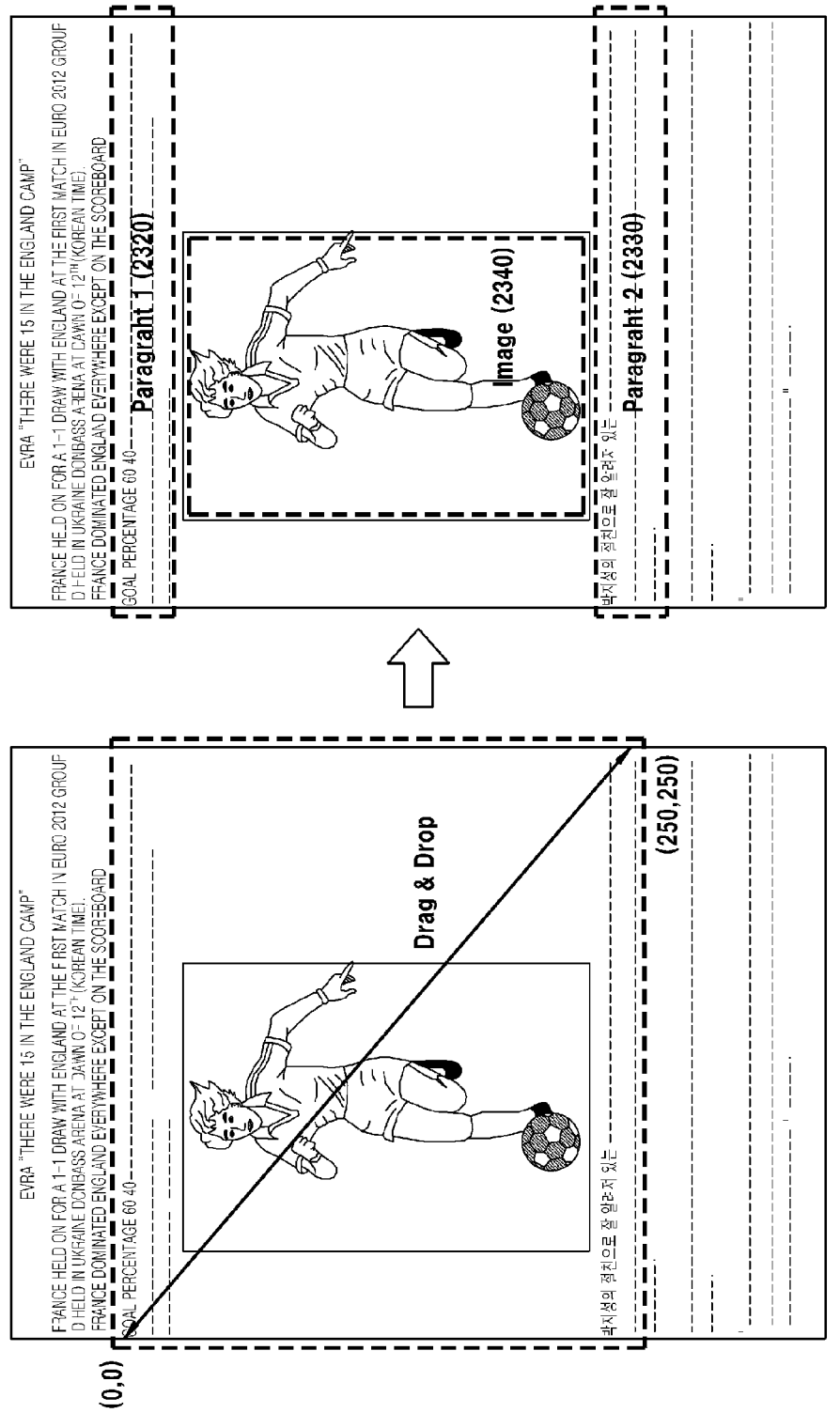
FIG. 23 shows an example of a user interface used to select a region within content in a document format, according to an embodiment.

FIG. 23 shows an example of a user interface used to select a region within content in a document format, according to an embodiment.

A coordinate may be designated according to a user input on a document appearing through a content edit interface on a screen of the first electronic device 110 (2300). Although a drag and drop method is used to designate the coordinate in FIG. 23, the embodiment of the present invention is not limited thereto and the coordinate may be designated in various ways.

The first electronic device 110 may select an object included in a region corresponding to the coordinate designated according to the user input (2310). For example, paragraph 1 2320, paragraph 2 2030, and image 2340 included in a rectangular region set according to coordinates (0, 0) and (250, 250) may be selected as shown in 2300. In this regard, the object selected by the first electronic device 110 may include text, images, moving images, tables, or graphs.

Figure 24:
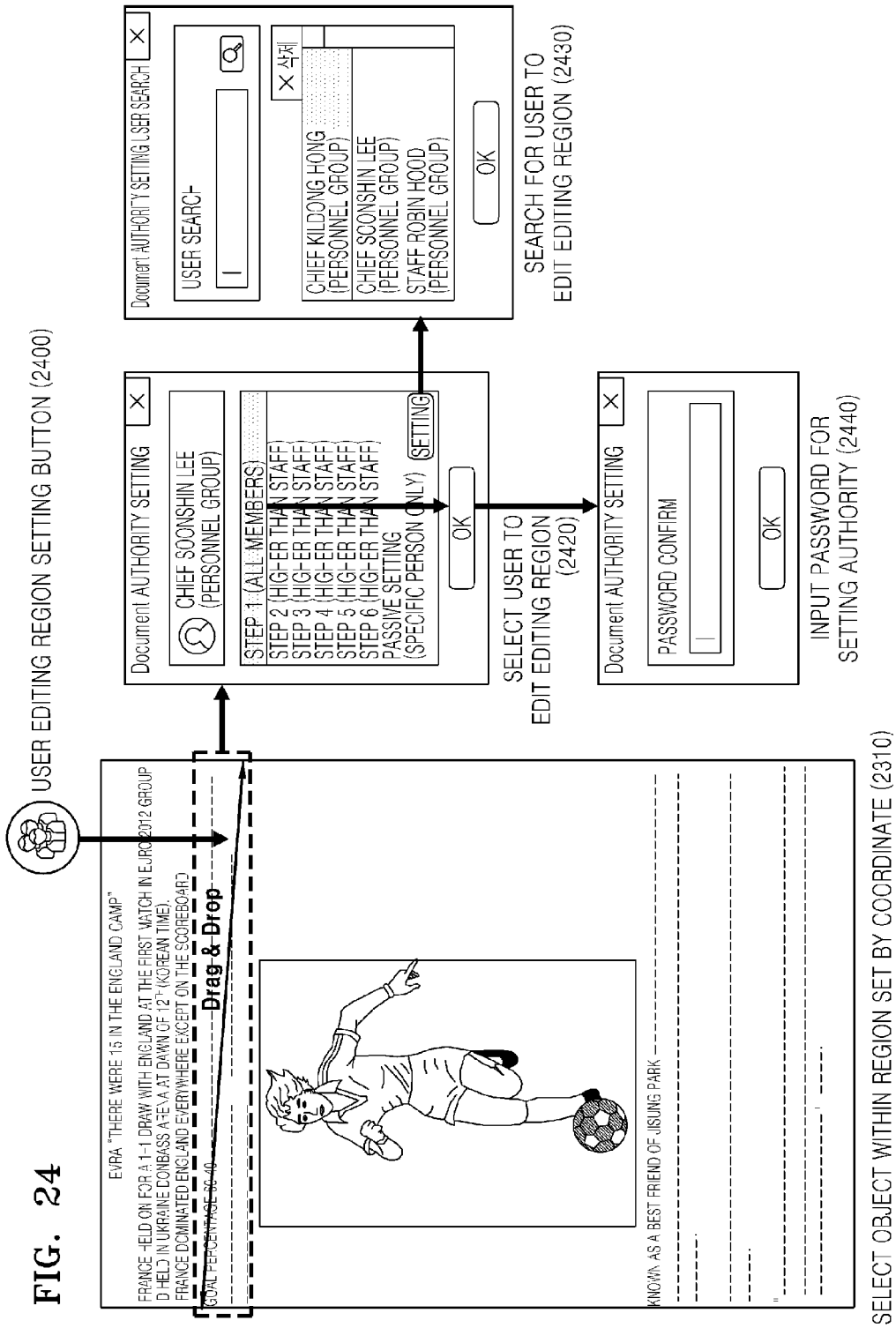
FIG. 24 shows an example of a user interface used to set an editing region for each within content in a document format, according to an embodiment.

FIG. 24 shows an example of a user interface used to set an editing region for each within content in a document format, according to an embodiment.

A content edit interface displayed on the first electronic device 110 may include a user editing region setting button 2400. After the user editing region setting button 2400 is selected, the first electronic device 110 may select an object included in content to select a region for setting an editing region within the content (2410).

When the region for setting the editing region is selected, the first electronic device 110 may display a window for selecting a user to set the editing region (2420). The user to set the editing region may be set according to a previously set group. Also, a window for searching for the user to set the editing region may be displayed (2430), and the user to set the editing region may be selected through the window for searching for the user.

Also, the first electronic device 110 may allow a password to be input so as to set the editing region within the content (2440).

Figure 25:
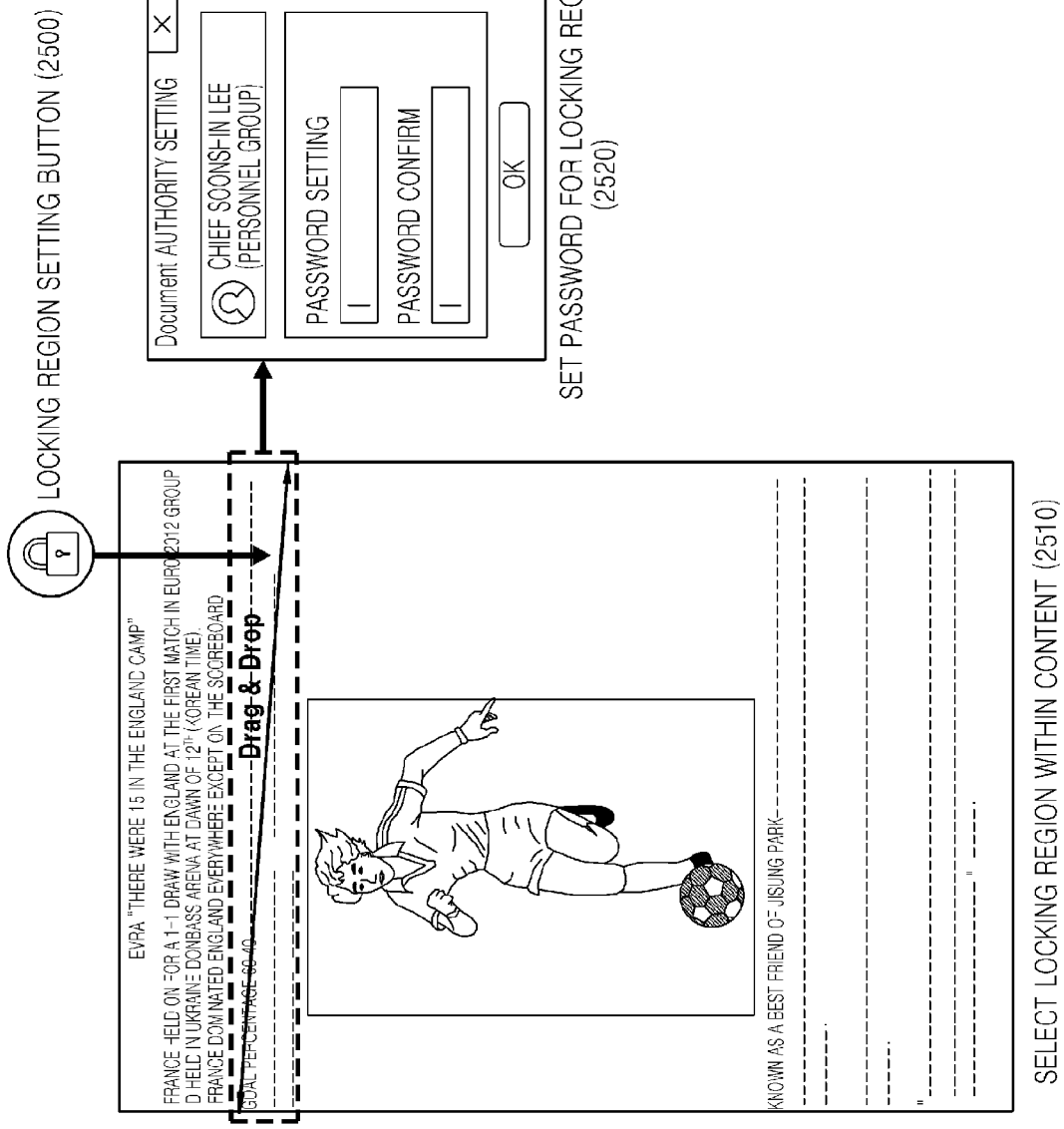
FIG. 25 shows an example of a user interface used to set a locking region within content in a document format, according to an embodiment.

FIG. 25 shows an example of a user interface used to set a locking region within content in a document format, according to an embodiment.

A content edit interface displayed on the first electronic device 110 may include a locking region setting button 2500. After the locking region setting button 2500 is selected, the first electronic device 110 may select a region for setting the locking region of the content by selecting an object included in the content (2510). When the locking region is selected, the first electronic device 110 may display a window for setting a password of the locking region (2520).

Figure 26:
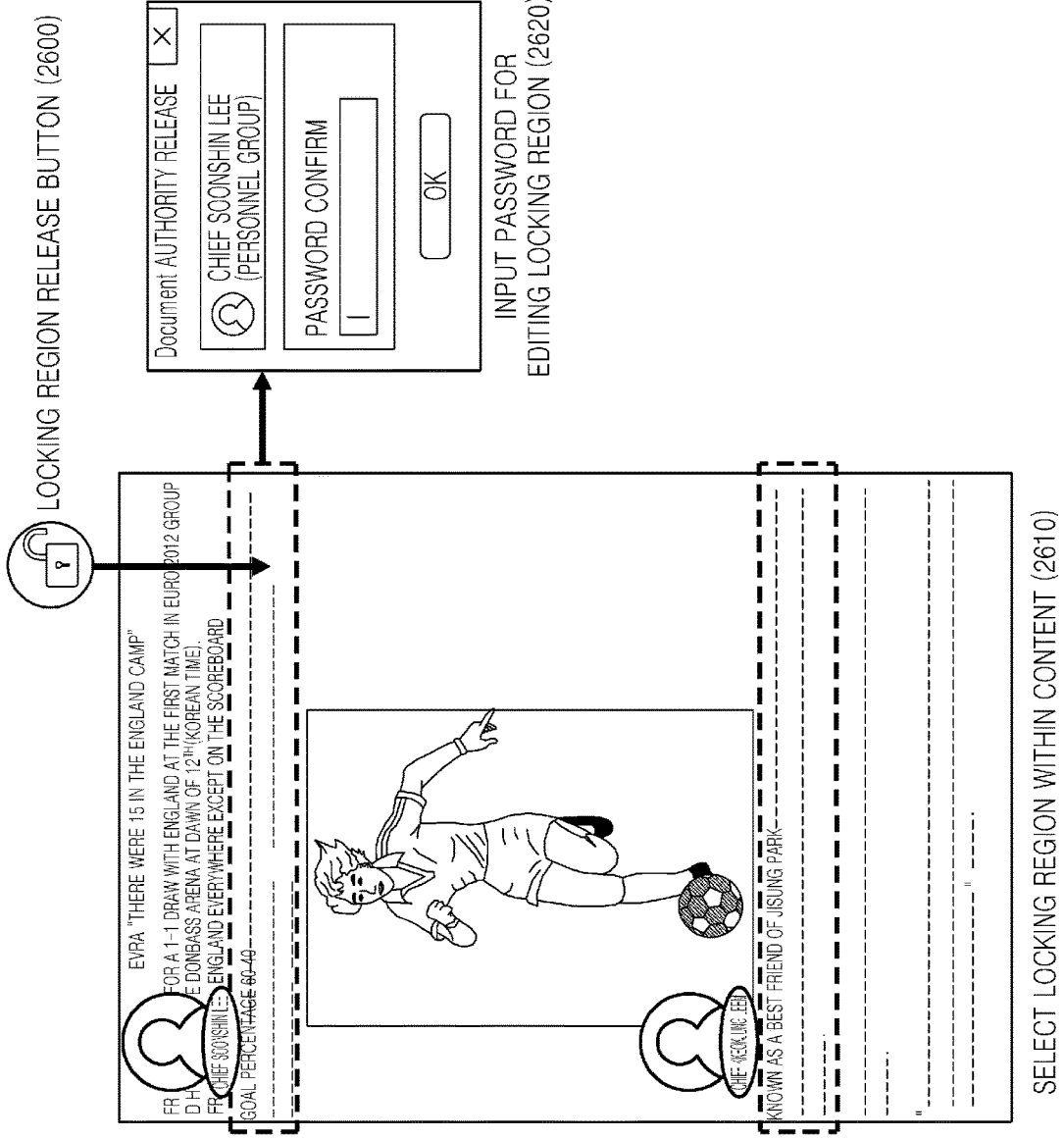
FIG. 26 shows an example of a user interface used to input an encryption so as to edit a locking region set within content in a document format, according to an embodiment.

FIG. 26 shows an example of a user interface used to input an encryption so as to edit a locking region set within content in a document format, according to an embodiment.

A content edit interface displayed on the first electronic device 110 may include a locking region releasing button 2600. Also, the content edit interface may display the locking region and information regarding a user that sets the locking region on the content (2610). After the locking region releasing button 2600 is selected, the first electronic device 110 may select a region set as the locking region (2610). In this regard, the content edit interface does not necessarily include the locking region releasing button 2600. The region set as the locking region may be set without selecting the locking region releasing button 2600 or according to an input for editing the region set as the locking region.

When the region set as the locking region is selected, a window for inputting a password set for the locking region may be displayed (2620). In this regard, the password set for the locking region may be a password set when the locking region is set.

One or more embodiments may be realized in a computer-readable recording medium, such as a program module executed by a computer. The computer-readable recording medium may be an arbitrary available medium accessible by a computer, and examples thereof include all volatile and non-volatile media and separable and non-separable media. Further, examples of the computer-readable recording medium may include a computer storage medium and a communication medium. Examples of the computer storage medium include all volatile and non-volatile media and separable and non-separable media, which have been implemented by an arbitrary method or technology, for storing information such as computer-readable commands, data structures, program modules, and other data. The communication medium typically includes a computer-readable command, a data structure, a program module, other data of a modulated data signal, or another transmission mechanism, and an example thereof includes an arbitrary information transmission medium.

While the present disclosure has been particularly shown and described with reference to exemplary embodiments thereof, it will be understood by those of ordinary skill in the art that various changes in form and details may be made therein without departing from the spirit and scope of the present invention as defined by the following claims. Hence, it will be understood that the embodiments described above are not limiting the scope of the invention. For example, each component described in a single type may be executed in a distributed manner, and components described distributed may also be executed in an integrated form.

The scope of the present disclosure is indicated by the claims which will be described in the following rather than the detailed description of the invention, and it should be understood that the claims and all modifications or modified forms drawn from the concept of the claims are included in the scope of the present invention.

What is claimed is:

1. A method for providing an instant messaging interface while editing a document at an electronic device using a document editing application, the method comprising:
controlling to provide a document on a display of the electronic device using the document editing application;
controlling to edit a first partial portion of the document on the document editing application;
based on receiving, while editing the first partial portion of the document on the document editing application, a selection of a lock option of the document editing application at the electronic device, controlling to request the first partial portion of the document to be prevented from being edited by a user of another electronic device, wherein the lock option is for receiving the selection to prevent editing of the first partial portion of the document;
controlling to provide an unlock option in the document editing application for releasing the first partial portion of the document being prevented from being edited by the user of the other electronic device;
controlling to receive first information regarding a second partial portion of the document and second information regarding the user of the other electronic device, wherein the second partial portion of the document is prevented from being edited, and the user of the other electronic device requested to prevent editing of the second partial portion of the document;
based on the first information and the second information, controlling to provide a user interface item at a position in the document, wherein the position in the document is based on the second partial portion of the document prevented from being edited, the user interface item is for indicating that the user of the other electronic device requested to prevent editing of the second partial portion of the document and for an interaction for causing an instant messaging interface to be provided, and the user interface item is provided based on the identity of the user of the other electronic device; and
based on the interaction involving the user interface item, controlling to cause an instant messaging interface to be provided, wherein the instant messaging interface is for communication with the user who requested to prevent editing of the second partial portion of the document,
wherein the lock option and unlock option are provided as user interface items in the document editing application, and
wherein, when the instant messaging interface is caused to be provided based on the interaction involving the user interface item, the instant messaging interface is provided in a separate window.

2. The method of claim 1, wherein the second partial portion being prevented from being edited is set by the user of the other electronic device which has edited the document based on a selection of a lock option of a document editing application at the other electronic device.

3. The method of claim 1, wherein the controlling to request the first partial portion of the document to be prevented from being edited by the user of the other electronic device is further based on receiving a drag input for selecting the first partial portion of the document.

4. The method of claim 1, wherein the first information and the second information are received from a server.

5. The method of claim 1, wherein the instant messaging interface for communication comprises an instant messaging window for transmitting and receiving messages to and from the user of the other electronic device.

6. The method of claim 1, wherein the user interface item comprises the second information.

7. The method of claim 1, wherein the interaction involving the user interface item comprises clicking.

8. The method of claim 1, wherein the interaction involving the user interface item comprises selecting the user interface item.

9. An electronic device comprising:
a memory storing instructions; and
at least one processor configured to execute the stored instructions to at least:
control to provide a document on a display of the electronic device using a document editing application;
control to edit a first partial portion of the document on the document editing application;
based on receiving, while editing the first partial portion of the document on the document editing application, a selection of a lock option of the document editing application at the electronic device, control to request the first partial portion of the document to be prevented from being edited by a user of another electronic device, wherein the lock option is for receiving the selection to prevent editing of the first partial portion of the document;
control to provide an unlock option in the document editing application for releasing the first partial portion of the document being prevented from being edited by the user of the other electronic device;
control to receive first information regarding a second partial portion of the document and second information regarding the user of the other electronic device, wherein the second partial portion of the document is prevented from being edited, and the user of the other electronic device requested to prevent editing of the second partial portion of the document;
based on the first information and the second information, control to provide a user interface item at a position in the document, wherein the position in the document is based on the second partial portion of the document prevented from being edited, the user interface item is for indicating that the user of the other electronic device requested to prevent editing of the second partial portion of the document and for an interaction for causing an instant messaging interface to be provided, and the user interface item is provided based on the identity of the user of the other electronic device; and
based on the interaction involving the user interface item, control to cause an instant messaging interface to be provided, wherein the instant messaging interface is for communication with the user who requested to prevent editing of the second partial portion of the document,
wherein the lock option and unlock option are provided as user interface items in the document editing application, and
wherein, when the instant messaging interface is caused to be provided based on the interaction involving the user interface item, the instant messaging interface is provided in a separate window.

10. The electronic device of claim 9, wherein the second partial portion being prevented from being edited is set by the user of the other electronic device which has edited the document based on a selection of a lock option of a document editing application at the other electronic device.

11. The electronic device of claim 9, wherein the controlling to request the first partial portion of the document to be prevented from being edited by the user of the other electronic device is further based on receiving a drag input for selecting the first partial portion of the document.

12. The electronic device of claim 9, wherein the first information and the second information are received from a server.

13. The electronic device of claim 9, wherein the instant messaging interface for communication comprises an instant messaging window for transmitting and receiving messages to and from the user of the other electronic device.

14. The electronic device of claim 9, wherein the user interface item comprises the second information.

15. The electronic device of claim 9, wherein the interaction involving the user interface item comprises clicking.

16. The electronic device of claim 9, wherein the interaction involving the user interface item comprises selecting the user interface item.

17. A non-transitory computer readable recording medium storing instructions executable by at least one processor of an electronic device to cause the at least one processor to at least:
    control to provide a document on a display of the electronic device using a document editing application;
    control to edit a first partial portion of the document on the document editing application;
    based on receiving, while editing the first partial portion of the document on the document editing application, a selection of a lock option of the document editing application at the electronic device, control to request the first partial portion of the document to be prevented from being edited by a user of another electronic device, wherein the lock option is for receiving the selection to prevent editing of the first partial portion of the document;
    control to provide an unlock option in the document editing application for releasing the first partial portion of the document being prevented from being edited by the user of the other electronic device;
    control to receive first information regarding a second partial portion of the document and second information regarding the user of the other electronic device, wherein the second partial portion of the document is prevented from being edited, and the user of the other electronic device requested to prevent editing of the second partial portion of the document;
    based on the first information and the second information, control to provide a user interface item at a position in the document, wherein the position in the document is based on the second partial portion of the document prevented from being edited, the user interface item is for indicating that the user of the other electronic device requested to prevent editing of the second partial portion of the document and for an interaction for causing an instant messaging interface to be provided, and the user interface item is provided based on the identity of the user of the other electronic device; and
    based on the interaction involving the user interface item, control to cause an instant messaging interface to be provided, wherein the instant messaging interface is for communication with the user who requested to prevent editing of the second partial portion of the document,
    wherein the lock option and unlock option are provided as user interface items in the document editing application, and
    wherein, when the instant messaging interface is caused to be provided based on the interaction involving the user interface item, the instant messaging interface is provided in a separate window.

18. The non-transitory computer readable recording medium of claim 17, wherein the second partial portion being prevented from being edited is set by the user of the other electronic device which has edited the document based on a selection of a lock option of a document editing application at the other electronic device.

19. The non-transitory computer readable recording medium of claim 17, wherein the controlling to request the first partial portion of the document to be prevented from being edited by the user of the other electronic device is further based on receiving a drag input for selecting the first partial portion of the document.

20. The non-transitory computer readable recording medium of claim 17, wherein the first information and the second information are received from a server.

21. The non-transitory computer readable recording medium of claim 17, wherein the instant messaging interface for communication comprises an instant messaging window for transmitting and receiving messages to and from the user of the other electronic device.

22. The non-transitory computer readable recording medium of claim 17, wherein the user interface item comprises the second information.

23. The non-transitory computer readable recording medium of claim 17, wherein the interaction involving the user interface item comprises clicking.

24. The non-transitory computer readable recording medium of claim 17, wherein the interaction involving the user interface item comprises selecting the user interface item.

25. A method for providing an instant messaging interface while editing a document at an electronic device using a document editing application, the method comprising:
    displaying a document on a display of the electronic device using the document editing application;
    editing a first partial portion of the document on the document editing application;
    based on receiving, while editing the first partial portion of the document on the document editing application, a selection of a lock option of the document editing application at the electronic device, requesting the first partial portion of the document to be prevented from being edited by a user of another electronic device, wherein the lock option is for receiving the selection to prevent editing of the first partial portion of the document;
    displaying an unlock option in the document editing application for releasing the first partial portion of the document being prevented from being edited by the user of the other electronic device;
    receiving first information regarding a second partial portion of the document and second information regarding the user of the other electronic device, wherein the second partial portion of the document is prevented from being edited, and the user of the other electronic device requested to prevent editing of the second partial portion of the document;
    based on the first information and the second information, displaying a user interface item at a position in the document, wherein the position in the document is based on the second partial portion of the document prevented from being edited, the user interface item is for indicating that the user of the other electronic device requested to prevent editing of the second partial portion of the document and for an interaction for causing an instant messaging interface to be displayed, and the user interface item is displayed based on the identity of the user of the other electronic device; and
based on the interaction involving the user interface item, causing an instant messaging interface to be displayed, wherein the instant messaging interface is for communication with the user who requested to prevent editing of the second partial portion of the document,
wherein the lock option and unlock option are displayed as user interface items in the document editing application, and
wherein, when the instant messaging interface is caused to be displayed based on the interaction involving the user interface item, the instant messaging interface is provided in a separate window.

26. The method of claim 25, wherein the second partial portion being prevented from being edited is set by the user of the other electronic device which has edited the document based on a selection of a lock option of a document editing application at the other electronic device.

27. The method of claim 25, wherein requesting the first partial portion of the document to be prevented from being edited by the user of the other electronic device is further based on receiving a drag input for selecting the first partial portion of the document.

28. The method of claim 25, wherein the first information and the second information are received from a server.

29. The method of claim 25, wherein the instant messaging interface for communication comprises an instant messaging window for transmitting and receiving messages to and from the user of the other electronic device.

30. The method of claim 25, wherein the user interface item comprises the second information.

31. The method of claim 25, wherein the interaction involving the user interface item comprises clicking.

32. The method of claim 25, wherein the interaction involving the user interface item comprises selecting the user interface item.

* * * * *